US012641329B2

(12) United States Patent
Guan et al.

(10) Patent No.: US 12,641,329 B2
(45) Date of Patent: May 26, 2026

(54) ELECTRONIC APPARATUS

(71) Applicant: Panasonic Intellectual Property Management Co., Ltd., Osaka (JP)

(72) Inventors: Yingchun Guan, Kanagawa (JP); Takao Takeshita, Tokyo (JP); Shinkuro Fujino, Kyoto (JP); Masami Saito, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 245 days.

(21) Appl. No.: 18/290,686

(22) PCT Filed: Jul. 20, 2022

(86) PCT No.: PCT/JP2022/028240
§ 371 (c)(1),
(2) Date: Aug. 16, 2024

(87) PCT Pub. No.: WO2023/003023
PCT Pub. Date: Jan. 26, 2023

(65) Prior Publication Data
US 2024/0414420 A1      Dec. 12, 2024

(30) Foreign Application Priority Data

Jul. 21, 2021    (JP) ................................. 2021-120618
Jul. 21, 2021    (JP) ................................. 2021-120625
Jul. 21, 2021    (JP) ................................. 2021-120627

(51) Int. Cl.
*H04N 23/51*          (2023.01)
*H04N 23/52*          (2023.01)

(52) U.S. Cl.
CPC ............. *H04N 23/51* (2023.01); *H04N 23/52* (2023.01)

(58) Field of Classification Search
CPC ........ G03B 30/00; H04N 23/51; H04N 23/52; H05K 9/0009
See application file for complete search history.

(56) References Cited

U.S. PATENT DOCUMENTS

2004/0184745 A1      9/2004 Mynatt et al.
2015/0029337 A1*     1/2015 Uchiyama ................ H01R 4/06
                                                                      348/148

(Continued)

FOREIGN PATENT DOCUMENTS

JP            6-26295            4/1994
JP            2015-26568         2/2015
JP            2018-74677         5/2018

OTHER PUBLICATIONS

Japan, Notice of Reasons for Refusal received in JP Application No. 2021-120618, dated May 20, 2025, and English language translation thereof.

(Continued)

*Primary Examiner* — Amy R Hsu
(74) *Attorney, Agent, or Firm* — Greenblum & Bernstein, P.L.C.

(57)          ABSTRACT

An electronic apparatus includes a noise generation source that generates electromagnetic noise and a housing. The housing includes first and second housing components defining an accommodation space R for accommodating the noise generation source. The first housing component includes a first fixing part and at least two ridge parts extending in directions away from the first fixing part. The second housing component includes a second fixing part fixed to the first fixing part, and at least two grooves extending in directions away from the second fixing part and into which the two ridge parts enter. The ridge parts and the grooves each have a protrusion amount and a depth that (Continued)

make the resonance frequency of the housing different from
the frequency of the electromagnetic noise.

13 Claims, 15 Drawing Sheets

(56)                    References Cited

U.S. PATENT DOCUMENTS

| | | | |
|---|---|---|---|
| 2016/0174420 A1* | 6/2016 | Cochrane ............. | H05K 9/0009 |
| | | | 361/818 |
| 2019/0252953 A1* | 8/2019 | Tsuboi ..................... | H02K 5/10 |
| 2020/0028997 A1* | 1/2020 | Park ..................... | G02B 27/646 |
| 2022/0124234 A1* | 4/2022 | Kawai .................... | H04N 23/52 |
| 2022/0239808 A1* | 7/2022 | Jang ....................... | G03B 30/00 |

OTHER PUBLICATIONS

Japan, Notice of Reasons for Refusal received in JP Application No.
2021-120625, dated May 20, 2025, and English language transla-
tion thereof.
International Search Report issued in International Patent Applica-
tion No. PCT/JP2022/028240, dated Oct. 11, 2022.
International Preliminary Report on Patentability issued in Interna-
tional Patent Application No. PCT/JP2022/028240, dated Feb. 1,
2024.

* cited by examiner

ELECTRONIC APPARATUS

TECHNICAL FIELD

The present disclosure relates to an electronic apparatus.

BACKGROUND ART

For example, Patent Document 1 discloses an electronic apparatus including a circuit substrate and a metal housing having an accommodation space for accommodating the circuit substrate. The housing includes a housing body that has an opening and accommodates the circuit substrate, and a lid that closes an opening of the housing body. An annular ridge part protruding toward the housing body is formed on an outer peripheral edge of the lid. An annular press-fit groove into which the ridge part of the lid is press-fitted is formed in an opening edge of the housing body. The ridge part of the lid is press-fitted into the press-fit groove of the housing body to close the accommodation space, so that radiation of electromagnetic noise (EMI) from the printed circuit substrate to the outside of a casing is suppressed, and malfunction resistance (EMS) of the printed circuit substrate due to electromagnetic noise from the outside is improved.

Patent Document

Patent Document 1: JP H6-26295 U

SUMMARY

Problems to be Solved by the Invention

Meanwhile, the housing of the electronic apparatus described in Patent Document 1 may resonate due to electromagnetic noise generated from the printed circuit substrate. If the resonant frequency of the housing substantially matches the frequency of the electromagnetic noise, the electromagnetic noise may be amplified by the resonance. As a result, the electronic apparatus may emit electromagnetic noise to the outside.

Therefore, an object of the present disclosure is to make a resonance frequency of a housing different from a frequency of electromagnetic noise generated from a noise generation source, in an electronic apparatus including the noise generation source that generates electromagnetic noise and the housing that accommodates the noise generation source.

Solutions to the Problems

In order to solve the above problems, according to one aspect of the present disclosure, provided is an electronic apparatus including:

a noise generation source that generates electromagnetic noise; and a housing made of a conductive material and accommodating the noise generation source, in which the housing includes first and second housing components defining an accommodation space for accommodating the noise generation source, the first housing component includes a first fixing part fixed to the second housing component, and at least two ridge parts protruding toward the second housing component and extending in directions away from the first fixing part, the second housing component includes a second fixing part fixed to the first fixing part of the first housing component, and at least two grooves extending in directions away from the second fixing part and into which the two ridge parts enter, and the ridge parts and the grooves each have a protrusion amount and a depth that make a resonance frequency of the housing different from a frequency of the electromagnetic noise.

Effects of the Invention

According to the present disclosure, in an electronic apparatus including a noise generation source that generates electromagnetic noise and a housing that accommodates the noise generation source, a resonance frequency of the housing can be made different from a frequency of the electromagnetic noise generated from the noise generation source.

BRIEF DESCRIPTION OF DRAWINGS

FIG. 5 is a cross-sectional view of the electronic apparatus taken along line B-B in FIG. 1;

FIG. 6 is a lower perspective view of a first housing component in an electronic apparatus of a comparative example;

FIG. 9 is a top view illustrating an electric field distribution in the electronic apparatus of the comparative example;

FIG. 10 is a frequency-EMI characteristic diagram illustrating a shift of a resonance frequency of the housing;

DETAILED DESCRIPTION

Hereinafter, a detailed description of an embodiment will be given with reference to drawings as appropriate. However, a detailed description more than necessary may be omitted in some cases. For example, a detailed description of a well-known item and a duplicate description for a substantially identical component may be omitted in some cases. This is to avoid an unnecessarily redundant description and to allow those skilled in the art to easily understand the following description.

In addition, the inventors provide the accompanying drawings and the following description in order for those skilled in the art to fully understand the present disclosure, and it is not intended to limit the subject matter described in the claims by these.

First Embodiment

Figure 1:
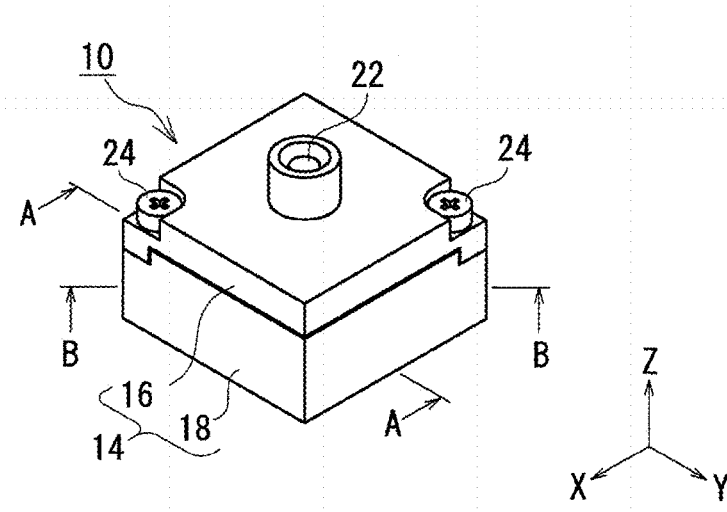
FIG. 1 is an upper perspective view of an electronic apparatus according to a first embodiment of the present disclosure.
Figure 2:
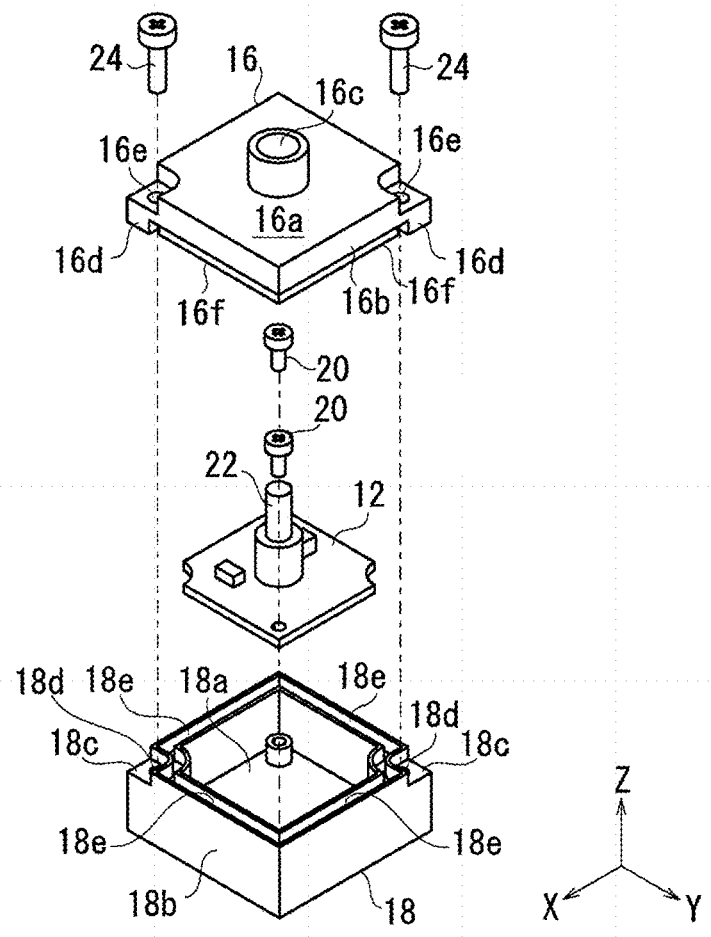
FIG. 2 is an exploded perspective view of the electronic apparatus.

FIG. 1 is an upper perspective view of an electronic apparatus according to a first embodiment of the present disclosure. FIG. 2 is an exploded perspective view of the electronic apparatus. Note that the X-Y-Z orthogonal coordinate system illustrated in the drawings is for facilitating understanding of the embodiment of the present disclosure, and is not for limiting the embodiment of the present disclosure.

As illustrated in FIGS. 1 and 2, an electronic apparatus 10 according to the first embodiment of the present disclosure is, for example, a small camera mounted on a vehicle. The electronic apparatus 10 includes a circuit substrate 12 that is a generation source for generating electromagnetic noise, and a housing 14 that is made of a conductive material such as a metal material and accommodates the circuit substrate 12. The housing 14 is rectangular parallelepiped in shape and includes a first housing component 16 and a second housing component 18.

Figure 3:
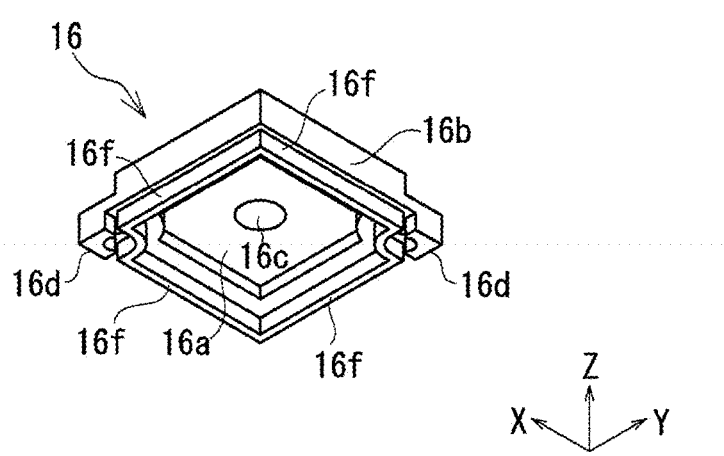
FIG. 3 is a lower perspective view of a first housing component.
Figure 4:
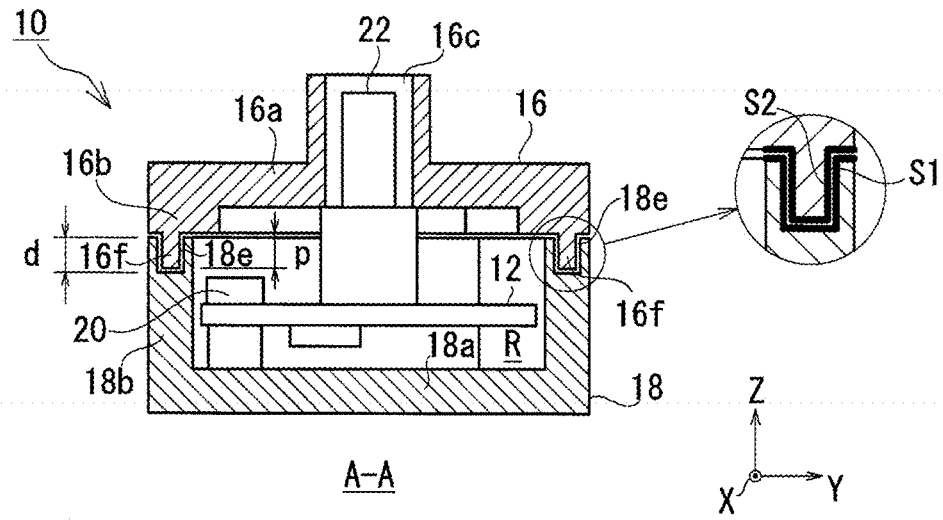
FIG. 4 is a cross-sectional view of the electronic apparatus taken along line A-A of FIG. 1.
Figures 5, 6:
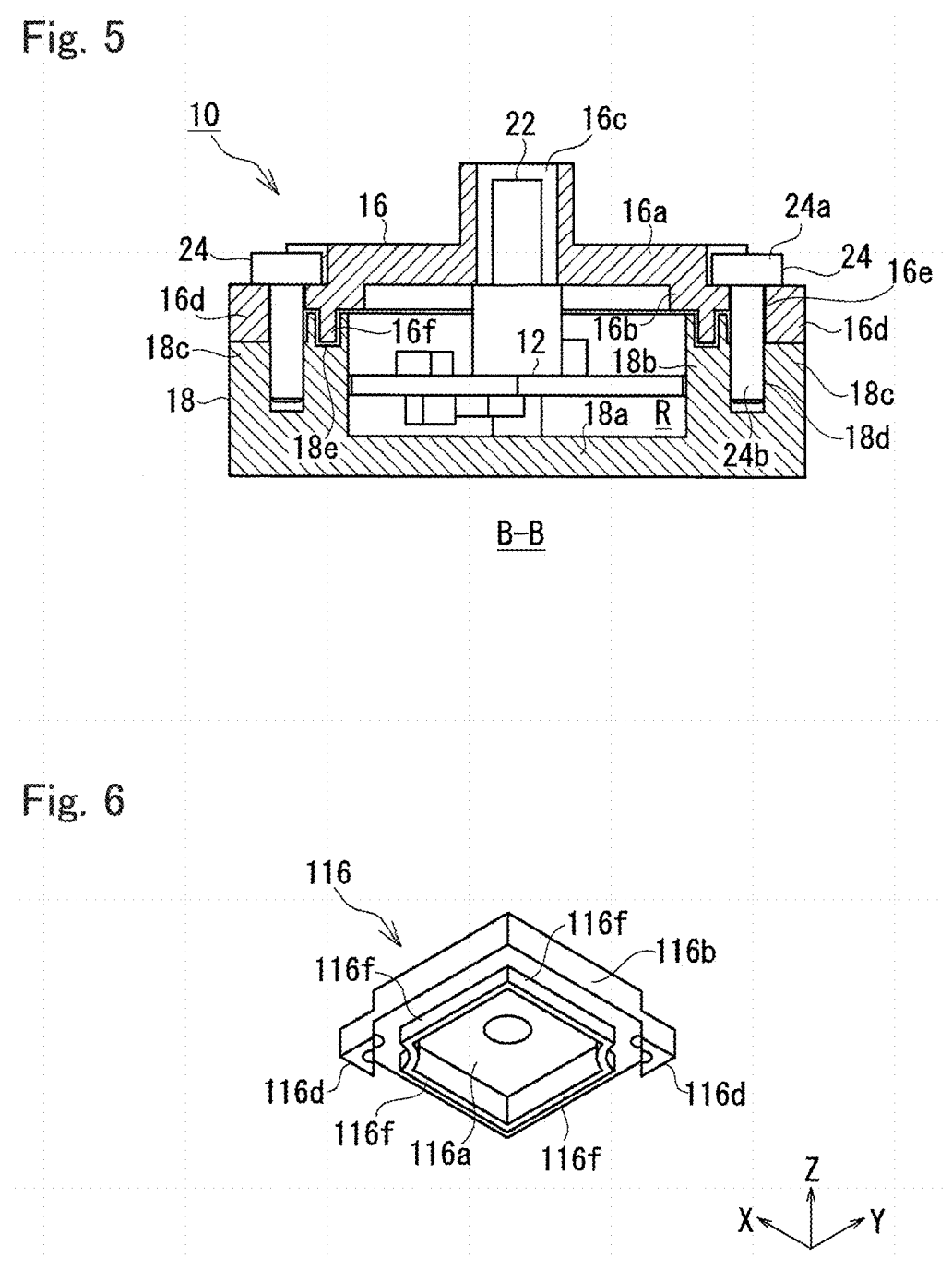

FIG. 3 is a lower perspective view of the first housing component. FIG. 4 is a cross-sectional view of the electronic apparatus taken along line A-A in FIG. 1. FIG. 5 is a cross-sectional view of the electronic apparatus taken along line B-B in FIG. 1.

As illustrated in FIGS. 4 and 5, the first housing component 16 and the second housing component 18 engage with each other to define an accommodation space R that accommodates the circuit substrate 12. Specifically, in the case of the present first embodiment, the first housing component 16 has a substantially bottomed cylindrical shape, and includes a rectangular plate-like base portion 16a and a side wall 16b protruding from an outer peripheral edge of the base portion 16a toward the second housing component 18. The second housing component 18 has a substantially bottomed cylindrical shape and includes a rectangular plate-like base portion 18a and a side wall 18b protruding from an outer peripheral edge of the base portion 18b toward the first housing component 16. The side wall 16b of the first housing component 16 and the side wall 18b of the second housing component 18 face each other at their respective top surfaces. When the first housing component 16 and the second housing component 18 are engaged with each other, the accommodation space R surrounded by the base portion 16a and the side wall 16b of the first housing component 16, and the base portion 18a and the side wall 18b of the second housing component 18 is defined.

In the case of the present first embodiment, the circuit substrate 12 is fixed to the base portion 18a of the second housing component 18 via a plurality of fixing screws 20. As a result, the circuit substrate 12 is electrically connected to the ground of the second housing component 18 (The potential of the second housing component 18 is the same as the ground potential of the circuit substrate 12.). In addition, when the electronic apparatus 10 is a small camera, an optical element such as a lens is attached to the second housing component 18. A connection cable 22 (power cable, cable including signal cable) that connects the circuit substrate 12 and an external device (not illustrated) passes through a through hole 16c formed in the base portion 16a of the first housing component 16.

The first and second housing components 16 and 18 are made of a conductive material, such as a metal material. In the case of the present first embodiment, the first and second housing components 16 and 18 are made of aluminum die-casting (ADC 12). As a result, radiation of electromagnetic noise generated from the circuit substrate 12 to the outside of the electronic apparatus 10 (electromagnetic interference (EMI)) is suppressed, and malfunction resistance (electromagnetic susceptibility (EMS)) of the circuit substrate 12 due to electromagnetic noise from the outside is improved.

In the case of the present first embodiment, the first and second housing components 16 and 18 are fixed to each other via a plurality of fixing screws 24.

Specifically, the side wall 16b of the first housing component 16 includes a first fixing part 16d fixed to the second housing component 18. In addition, the side wall 18b of the second housing component 18 includes a second fixing part 18c fixed to the first fixing part 16d of the first housing component 16.

In the case of the present first embodiment, two first fixing parts 16d are arranged diagonally on the rectangular side wall 16b of the first housing component 16 as viewed in the engagement direction (as viewed in the Z-axis direction) of the first and second housing components 16 and 18. Similarly, two second fixing parts 18c are arranged diagonally on the rectangular side wall 18b of the second housing component 18.

In the case of the present first embodiment, a through hole 16e through which the fixing screw 24 passes is formed in the first fixing part 16d of the first housing component 16. A female screw hole 18d into which the fixing screw 24 is screwed is formed in the second fixing part 18c of the second housing component 18. The fixing screw 24 passes through the through hole 16e of the first fixing part 16d and is screwed into the female screw hole 18*d* of the second fixing part 18*c*, whereby the first fixing part 16*d* and the second fixing part 18*c* are fixed to each other and are connected in a direct current manner. Alternatively, a female screw hole may be formed in the first fixing part 16*d*, and a through hole may be formed in the second fixing part 18*c*.

In the case of the present first embodiment, the first housing component 16 and the second housing component 18 are made of aluminum die-cast and subjected to alumite treatment. Therefore, the contact surfaces of the first fixing part 16*d* and the second fixing part 18*c* are covered with the oxide film, and thus are not connected in a direct current manner. However, the first fixing part 16*d* and the second fixing part 18*c* are connected in a direct current manner via the fixing screw 24 made of a conductive material such as a metal material. That is, a head portion 24*a* of the fixing screw 24 is in contact with the first fixing part 16*d* and is connected in a direct current manner, and a shaft portion 24*b* of the fixing screw 24 on which a male screw is formed is screwed into the female screw hole 18*d* of the second fixing part 18*c* and is connected in a direct current manner. The oxide film of a portion of the first fixing part 16*d* in contact with the head portion 24*a* of the fixing screw 24 is scraped off by the rotation of the head portion 24*a* when the fixing screw 24 is tightened, so that the portion can be connected to the head portion 24*a* of the fixing screw 24 in a direct current manner. Further, since the female screw hole 18*d* is formed by tapping after alumite treatment, the female screw hole can be connected to the shaft portion 24*b* of the fixing screw 24 in a direct current manner.

In the case of the present first embodiment, the side wall 16*b* of the first housing component 16 includes a plurality of ridge parts 16*f* protruding toward the second housing component 18 and extending in a direction away from each of the plurality of first fixing parts 16*d* (X-axis direction or Y-axis direction). Specifically, two ridge parts 16*f* extend in a direction away from one first fixing part 16*d*. In the case of the present first embodiment, the plurality of (four) ridge parts 16*f* are connected to each other to form one annular ridge part. In the case of the present first embodiment, the ridge part 16*f* has a rectangular cross section, but the ridge part 16*f* may have a cross section of another shape such as an inverted triangular shape.

In addition, in the case of the present first embodiment, the side wall 18*b* of the second housing component 18 includes a plurality of grooves 18*e* into which the plurality of ridge parts 16*f* of the first housing component 16 enter while extending in the direction (X-axis direction or Y-axis direction) away from the second fixing part 18*c*. Specifically, two grooves 18*e* extend in a direction away from one second fixing part 18*c*. In the present first embodiment, the plurality of (four) grooves 18*e* are connected to each other to form one annular groove. In the present first embodiment, the groove 18*e* has a rectangular cross section corresponding to the ridge part 16*f* having a rectangular cross section. That is, the groove 18*e* may have a cross-sectional shape corresponding to the cross-sectional shape of the ridge part 16*f*.

When the first fixing part 16*d* of the first housing component 16 is fixed to the second fixing part 18*c* of the corresponding second housing component 18, the plurality of ridge parts 16*f* enter the corresponding groove 18*e* with a gap. When the surfaces of the first and second housing components 16 and 18 are covered with an oxide film (insulating layer) as in the present first embodiment, the outer surface of the ridge part 16*f* may be in contact with the inner surface of the groove 18*e*.

A protrusion amount p (size in the Z-axis direction) of the ridge part 16*f* of the first housing component 16 and a depth d (size in the Z-axis direction) of the groove 18*e* of the second housing component 18 are set to sizes that can suppress the occurrence of resonance of the housing 14 due to electromagnetic noise generated from the circuit substrate 12. This will be described with reference to Comparative Examples.

Figure 7:
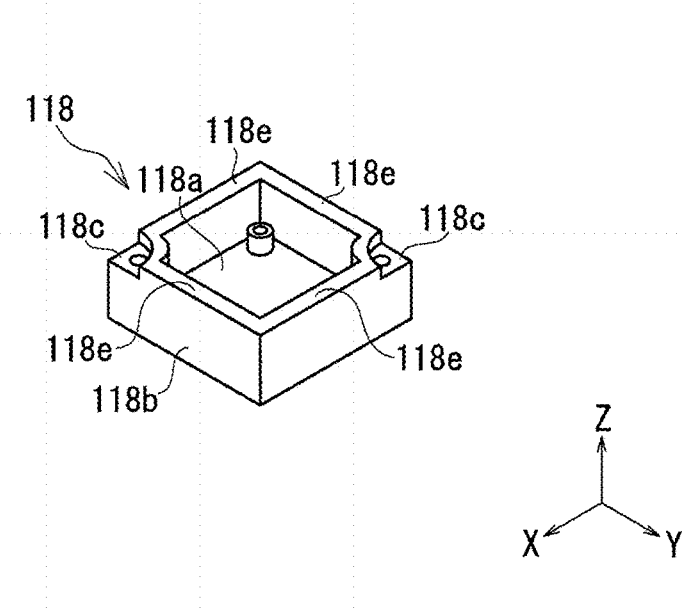
FIG. 7 is an upper perspective view of a second housing component in the electronic apparatus of the comparative example.
Figure 8:
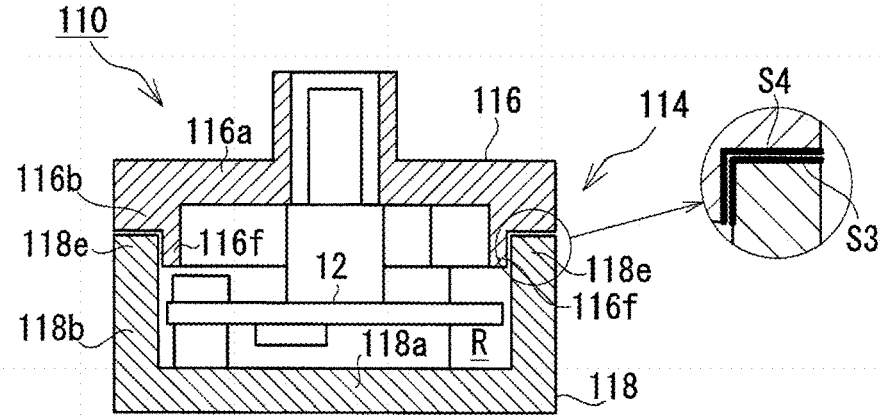
FIG. 8 is a cross-sectional view of the electronic apparatus of the comparative example.
Figures 9, 10:
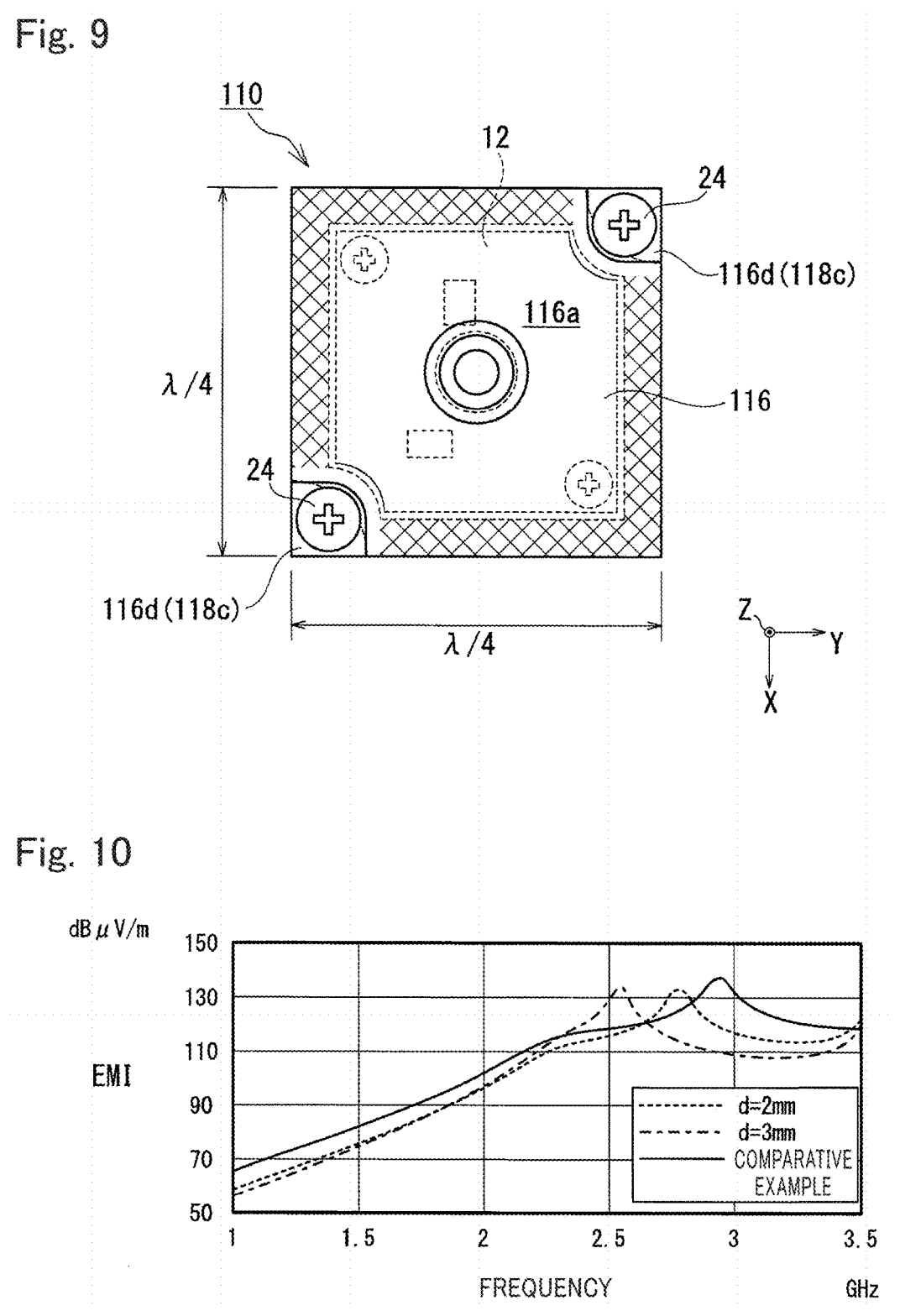

FIG. 6 is a lower perspective view of a first housing component in an electronic apparatus of a comparative example. FIG. 7 is an upper perspective view of a second housing component in the electronic apparatus of the comparative example. FIG. 8 is a cross-sectional view of the electronic apparatus according to the comparative example. Furthermore, FIG. 9 is a top view illustrating an electric field distribution in the electronic apparatus of the comparative example. FIG. 10 is a frequency-EMI characteristic diagram illustrating the shift of the resonance frequency of the housing.

As illustrated in FIGS. 6 to 9, in an electronic apparatus 110 of the comparative example, a first housing component 116 includes a rectangular plate-shaped base portion 116*a* and a side wall 116*b* protruding from an outer peripheral edge of the base portion 116*a* toward a second housing component 118. The second housing component 118 includes a rectangular plate-shaped base portion 118*a* and a side wall 118*b* protruding from an outer peripheral edge of the base portion 118*a* toward the first housing component 116. The side wall 116*b* of the first housing component 116 and the side wall 118*b* of the second housing component 118 face each other at their respective top surfaces. When the side wall 116*b* of the first housing component 116 and the side wall 118*b* of the second housing component 118 function as engagement portions that engage with each other, an accommodation space R that is surrounded by the base portion 116*a* and the side wall 116*b* of the first housing component 116 and the base portion 118*a* and the side wall 118*b* of the second housing component 118 and accommodates the circuit substrate 12 is defined.

In the electronic apparatus 110 of the comparative example, the side wall 116*b* of the first housing component 116 includes a first fixing part 116*d* fixed to the second housing component 118. In addition, the side wall 118*b* of the second housing component 118 includes a second fixing part 118*c* fixed to the first fixing part 116*d* of the first housing component 116. The first fixing part 116*d* and the second fixing part 118*c* are fixed to each other via the fixing screw 24.

Furthermore, in the electronic apparatus 110 of the comparative example, two first fixing parts 116*d* are arranged diagonally on the rectangular side wall 116*b* of the first housing component 116 as viewed in the engagement direction (as viewed in the Z-axis direction) of the first and second housing components 116 and 118. Similarly, two second fixing parts 118*c* are arranged diagonally on the rectangular side wall 118*b* of the second housing component 118.

In the case of the electronic apparatus 110 of the comparative example, in the side wall 116*b* of the first housing component 116, at a portion other than the first fixing part 116*d*, that is, at a portion not fixed to the second housing component 118, a plurality of first inner wall portions 116*f* protruding toward the second housing component 116 and extending in a direction away from the plurality of first fixing parts 116*d* (X-axis direction or Y-axis direction) are provided. Specifically, two first inner wall portions 116*f* extend in a direction away from one first fixing part 116*d*.

The plurality of (four) first inner wall portions 116f are connected to each other to constitute one annular inner wall portion.

In addition, in the case of the electronic apparatus 110 of the comparative example, in the side wall 118b of the second housing component 118, at a portion other than the second fixing part 118c, that is, at a portion not fixed to the first housing 116, a plurality of second inner wall portions 118e protruding toward the first housing component 116 and extending in a direction away from the plurality of second fixing parts 118c (X-axis direction or Y-axis direction) are provided. Specifically, two second inner wall portions 118e extend in a direction away from one first fixing part 118c. The plurality of (four) second inner wall portions 118e are connected to each other to constitute one annular inner wall portion. In addition, the second inner wall portions 118e are arranged on the outer side with respect to the first inner wall portion 116f of the first housing component 116 with a gap. When the surfaces of the first and second housing components 116 and 118 are covered with an oxide film (insulating layer), the second inner wall portion 118e may be in contact with the first inner wall portion 116f.

According to the electronic apparatus 110 of the comparative example, a housing 114 can resonate due to the electromagnetic noise generated from the circuit substrate 12 inside the electronic apparatus. Specifically, as illustrated in FIG. 9, an electric field (cross-hatched portion) having a higher strength than other portions is generated between the side wall 116b of the first housing component 116 and the side wall 118b of the second housing component 118. The intensity of the electric field increases as the distance from the first fixing part 116d (the second fixing part 118c) increases. That is, the intensity of the electric field is highest at the corner of the side wall 116b (118b) where the first fixing part 116d (second fixing part 118c) is not provided.

When such an electric field distribution is generated, portions of the first and second housing components 116 and 118 having a high electric field strength function as if they were "dipole antennas". Specifically, the first fixing part 116d and the second fixing part 118c fixed to each other via a fixing screw function as "a feeding point" of the "dipole antenna". In addition, two first inner wall portions 116f extending in a direction away from the first fixing part 116d functioning as the "feeding point" and two second inner wall portions 118e extending in a direction away from the second fixing part 118c function as "elements" of the "dipole antenna" that receives the electromagnetic noise. When the "dipole antenna" receives the electromagnetic noise generated from the circuit substrate 12, the housing 114 resonates.

In particular, as shown in FIG. 9, when one side (that is, the side wall 114b) of the rectangular housing 114 is substantially ¼ of the wavelength λ of the frequency of the electromagnetic noise as viewed in the engagement direction (as viewed in the Z-axis direction) of the first housing component 116 and the second housing component 118, the housing 114 resonates greatly. That is, when the extending-direction lengths of the two first inner wall portions 116f extending in the direction away from the first fixing part 116d (the X-axis direction or the Y-axis direction) and the two second inner wall portions 118e extending in the direction away from the second fixing part 118c (the X-axis direction or the Y-axis direction) are ¼ of the wavelength λ of the frequency of the electromagnetic noise, the housing 114 has substantially the same resonance frequency as the frequency of the electromagnetic noise. In other words, housing 114 includes a "half-wavelength dipole antenna".

In order to suppress such resonance of the housing, in the electronic apparatus 10 according to the present first embodiment, the protrusion amount p of the ridge part 16f of the first housing component 16 and the depth d of the groove 18e of the second housing component 18 are appropriately set.

The frequency-EMI characteristic diagram of FIG. 10 is a result obtained by simulation, in which a frequency of electromagnetic noise radiated from the circuit substrate 12 is changed, and intensity of the electromagnetic noise (EMI) which changes accordingly and is radiated from the housing is illustrated. In FIG. 10, a solid line indicates the intensity of the electromagnetic noise radiated from the housing 114 of the electronic apparatus 110 of the comparative example. In addition, a broken line indicates the intensity of the electromagnetic noise radiated from the housing 14 of the electronic apparatus 10 according to the present first embodiment, and indicates the intensity when the depth d of the groove 18e in the side wall 18b (engagement portion) of the second housing component 18 is 2 mm. Further, the alternate long and short dash line indicates the intensity of the electromagnetic noise radiated from the housing 14 of the electronic apparatus 10 according to the first embodiment, and indicates the intensity when the depth d of the groove 18e is 3 mm.

As indicated by a broken line and an alternate long and short dash line in FIG. 10, in the housing 14 of the electronic apparatus 10 according to the present first embodiment, when the depth d of the groove 18e of the second housing component 18 increases, the peak value of the intensity of EMI radiated from the housing 14 shifts to the low frequency side, that is, the resonance frequency of the housing 14 shifts to the low frequency side. The peak value of the intensity of EMI radiated from the housing 14 of the present first embodiment is lower than the peak value in the electronic apparatus 110 of the comparative example.

Such a shift in the peak value of the intensity of EMI occurs, as illustrated in FIGS. 4 and 8, due to a difference in the sizes of surface areas S1, S2, S3, and S4 (surface areas of enlarged portions indicated by thick lines) of portions facing each other with an insulator interposed therebetween in a region where the first housing component and the second housing are engaged with each other. The term "insulator" as used herein refers to air, an oxide film, a seal member, and the like. That is, in a case where the electronic apparatus 10 according to the present first embodiment is compared with the electronic apparatus 110 according to the comparative example, as illustrated in FIGS. 4 and 8, the surface areas S1 and S2 of portions facing each other at a short distance in the electronic apparatus 10 according to the present first embodiment are larger than the surface areas S3 and S4 of the electronic apparatus 110 according to the comparative example. In addition, as the depth d of the groove 18e of the side wall 18b of the second housing component 18 increases, the surface area of portions facing each other at a short distance increases. The greater the surface area, the greater the capacitive coupling between the first housing component and the second housing component, thereby reducing the strength of the overall electric field generated between the sidewall of the first housing component and the sidewall of the second housing component. As a result, the peak value of the intensity of EMI radiated from the housing 14 shifts to the low frequency side, that is, the resonance frequency of the housing shifts to the low frequency side. The inventors have found frequency characteristics with respect to the surface areas of such first and second housing components 16 and 18 by simulation.

Therefore, if the protrusion amount p of the ridge part 16f of the first housing component 16 and the depth d (the size in the Z-axis direction) of the groove 18e of the second housing component 18 are appropriately set, that is, if the surface areas of the portions facing each other at a short distance are appropriately set, the resonance frequency of the housing 14 can be made different from the frequency of the electromagnetic noise generated from the circuit substrate 12.

In addition, as in the electronic apparatus 110 of the comparative example illustrated in FIG. 9, as viewed in the engagement direction of the first housing component 16 and the second housing component 18 (as viewed in the Z-axis direction), even if one side (that is, the lengths of the side walls 16b and 18b in the extending direction) of the rectangular housing 14 in the electronic apparatus 10 of the present first embodiment is substantially ¼ of the wavelength λ of the frequency of the electromagnetic noise, the resonance frequency of the housing 14 can be made different from the frequency of the electromagnetic noise generated from the circuit substrate 12 without changing the size of the housing 14.

Note that, the ridge part 16f and the groove 18e further suppress radiation (EMI) of the electromagnetic noise generated from the circuit substrate 12 to the outside of the electronic apparatus 10, and further improve malfunction resistance (EMS) of the circuit substrate 12 due to the electromagnetic noise from the outside (compared with the electronic apparatus 110 of the comparative example). That is, the ridge part 16f and the groove 18e increase the length of the gap between the side wall 16b of the first housing component 16 and the side wall 18b of the second housing component 18 (space distance from the inside to the outside of the housing 14). Thereby, the electromagnetic noise propagates while being multiple-reflected in the gap between the side wall 16b of the first housing component 16 and the side wall 18b of the second housing component 18, and as a result, the electromagnetic noise is attenuated.

According to the present first embodiment, in the electronic apparatus including the circuit substrate that generates the electromagnetic noise and the housing that accommodates the circuit substrate, the resonance frequency of the housing can be made different from the frequency of the electromagnetic noise generated from the circuit substrate.

Second Embodiment

The present second embodiment is an improvement of the first embodiment. Therefore, the present second embodiment will be described focusing on differences from the first embodiment.

Figure 11:
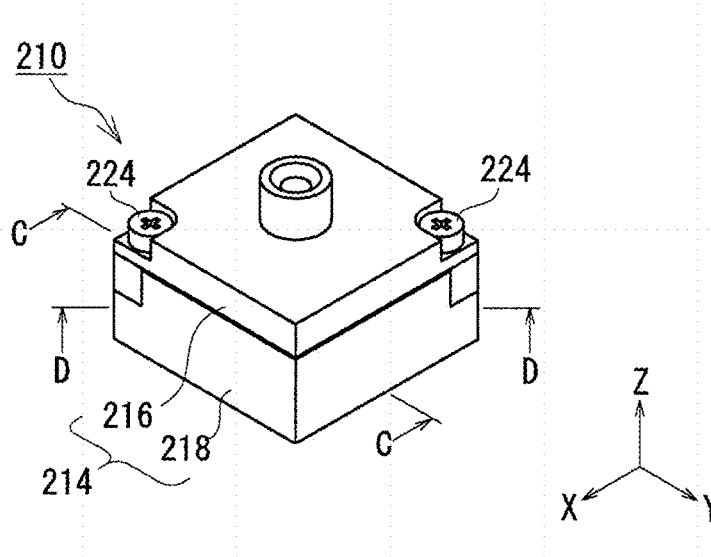
FIG. 11 is an upper perspective view of an electronic apparatus according to a second embodiment of the present disclosure.
Figure 12:
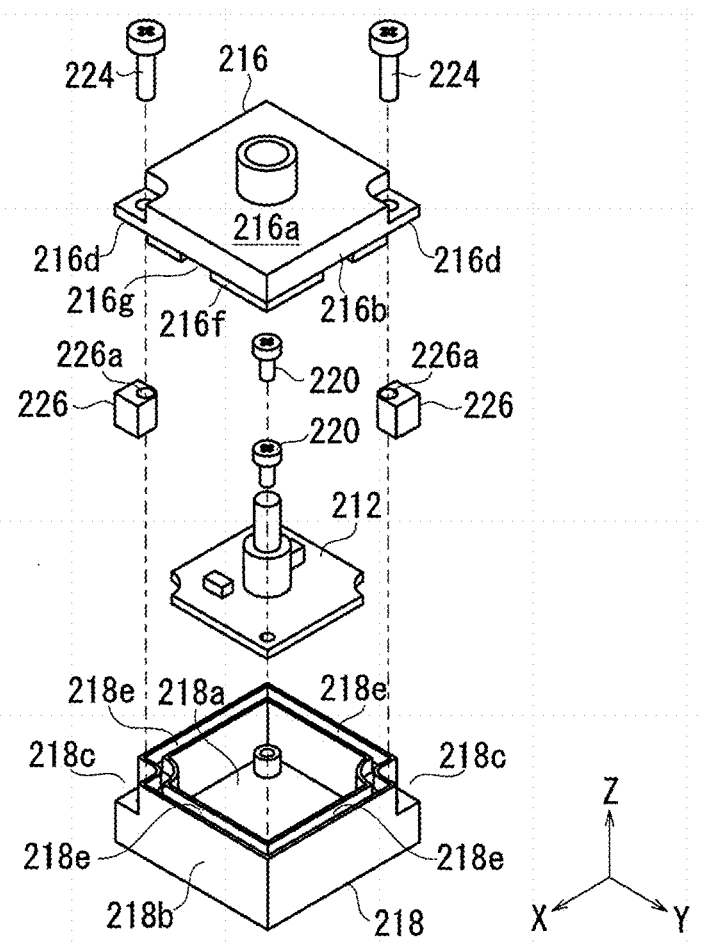
FIG. 12 is an exploded perspective view of the electronic apparatus.
Figure 13:
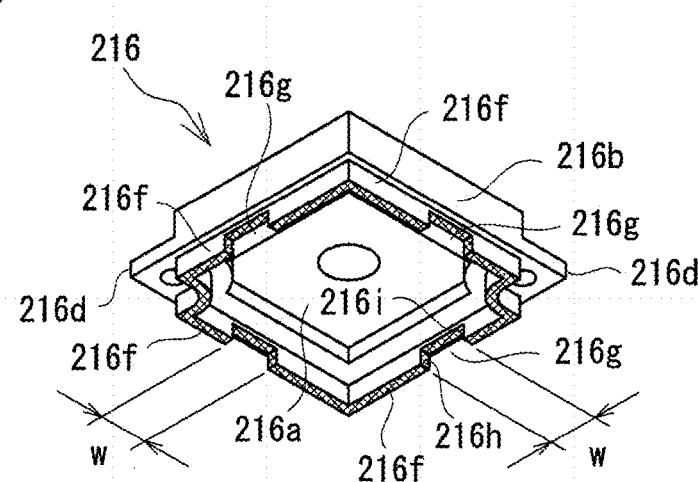
FIG. 13 is a lower perspective view of the first housing component.
Figure 14:
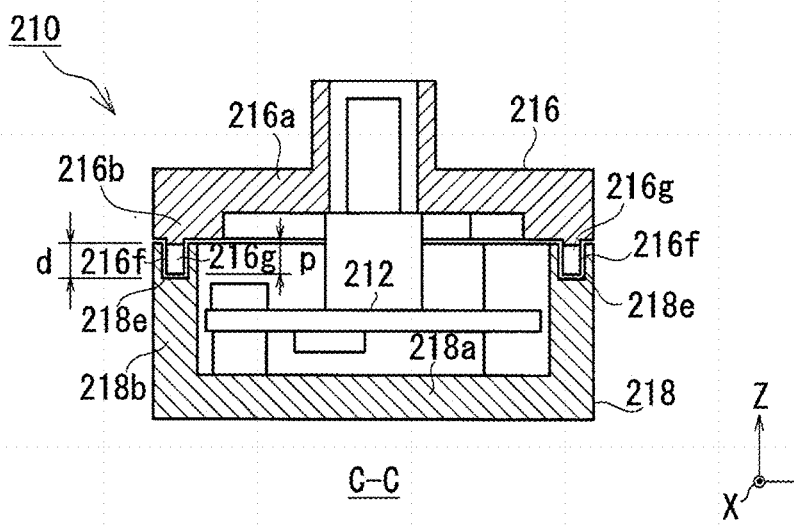
FIG. 14 is a cross-sectional view of the electronic apparatus taken along line C-C in FIG. 11.
Figure 15:
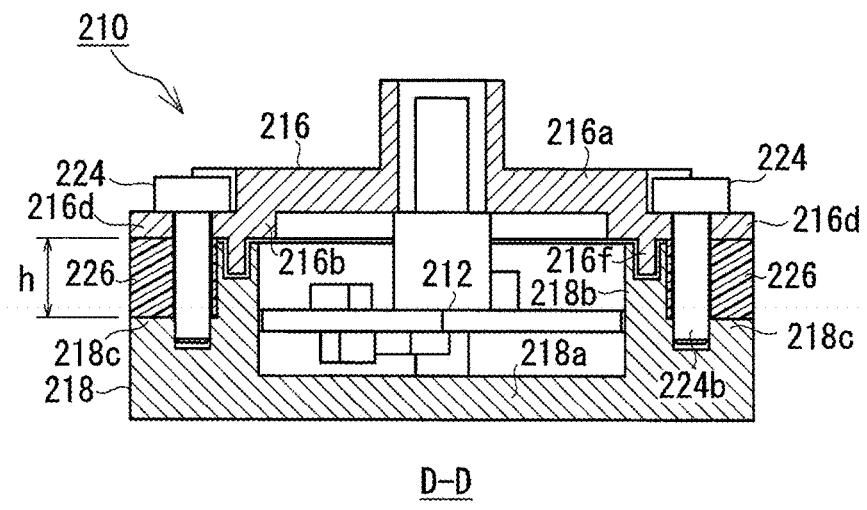
FIG. 15 is a cross-sectional view of the electronic apparatus taken along line D-D in FIG. 11.

FIG. 11 is an upper perspective view of an electronic apparatus according to the second embodiment of the present disclosure. FIG. 12 is an exploded perspective view of the electronic apparatus. FIG. 13 is a lower perspective view of the first housing component. FIG. 14 is a cross-sectional view of the electronic apparatus taken along line C-C in FIG. 11. FIG. 15 is a cross-sectional view of the electronic apparatus taken along line D-D in FIG. 11.

As illustrated in FIGS. 11 and 12, an electronic apparatus 210 according to the second embodiment of the present disclosure includes a circuit substrate 212 that is a generation source that generates electromagnetic noise, and a housing 214 that is made of a conductive material such as a metal material and accommodates the circuit substrate 212.

The housing 214 is rectangular parallelepiped in shape and includes a first housing component 216 and a second housing component 218.

In the case of the present second embodiment, the first housing component 216 has a substantially bottomed cylindrical shape and includes a rectangular plate-like base portion 216a and a side wall 216b protruding from an outer peripheral edge of the base portion 216a toward the second housing component 218. The second housing component 218 has a substantially bottomed cylindrical shape and includes a rectangular plate-like base portion 218a and a side wall 218b protruding from an outer peripheral edge of the base portion 218a toward the first housing component 216. The circuit substrate 212 is fixed to the base portion 218a of the second housing component 218 via a plurality of fixing screws 220.

In the case of the present second embodiment, the first and second housing components 216 and 218 are fixed to each other via a plurality of fixing screws 224. Specifically, the side wall 216b of the first housing component 216 includes a first fixing part 216d fixed to the second housing component 218. In addition, the side wall 218b of the second housing component 218 includes a second fixing part 218c fixed to the first fixing part 218d of the first housing component 216.

In the side wall 216b of the first housing component 216, a portion other than the first fixing part 216d is not fixed to the second housing component 218. Similarly, in the side wall 218b of the second housing component 218, a portion other than the second fixing part 218 is not fixed to the first housing component 216.

In the case of the present second embodiment, the side wall 216b of the first housing component 216 includes a plurality of ridge parts 216f protruding toward the second housing component 218 and extending in a direction away from each of the plurality of first fixing parts 216d (X-axis direction or Y-axis direction). Specifically, two ridge parts 216f extend in a direction away from one first fixing part 216d.

In addition, in the case of the present second embodiment, the side wall 218b of the second housing component 218 includes a plurality of grooves 218e into which the plurality of ridge parts 216f of the first housing component 216 enter while extending in the direction (X-axis direction or Y-axis direction) away from the second fixing part 218c. Specifically, two grooves 218e extend in a direction away from one second fixing part 218c.

Further, in the case of the present second embodiment, a cutout portion 216g is formed on the top surface of at least one of the plurality of ridge parts 216f of the side wall 216b of the first housing component 216. In the case of the present second embodiment, the cutout portion 16g is formed in each of the plurality of ridge parts 216f.

The cutout portion 216g has a groove shape extending from the inside of the housing 214 toward the outside, and divides the top surface of the ridge part 216f. In the case of the present second embodiment, the cutout portion 216b is formed at the center in the extending direction (X-axis direction or Y-axis direction) of the ridge part 216f.

Furthermore, in the case of the present second embodiment, the first fixing part 216d of the first housing component 216 and the second fixing part 218c of the second housing component 218 are not in direct contact but are in contact via a dielectric 226. The dielectric 226 is a member made of, for example, a resin material, and includes a through hole 226a through which a shaft portion 224b of the fixing screw 224 passes.

By appropriately setting the protrusion amount p of the ridge part 216f and the width w of the cutout portion 216g in the side wall 216b of the first housing component 216, the depth d of the groove 218e in the side wall 218b of the second housing component 218, and the height h of the dielectric 226, the resonance frequency of the housing 214 can be shifted, thereby making the frequency different from the frequency of the electromagnetic noise generated from the circuit substrate 212.

Specifically, first, in order to realize first shift of the resonance frequency, the protrusion amount p of the ridge part 216f in the side wall 216b of the first housing component 216, and the depth d of the groove 218e in the side wall 218b of the second housing component 218 are appropriately set.

In addition, in order to realize another shift of the resonance frequency, the width w of the cutout portion 216g in the ridge part 216f of the side wall 216b of the first housing component 216 is appropriately set.

In order to realize yet another shift of the resonance frequency, the height h of the dielectric 226 between the first fixing part 216d of the first housing component 216 and the second fixing part 218c of the second housing component 218 is appropriately set.

By realizing these three shifts of the resonance frequency in combination, the resonance frequency of the housing 214 can be made different from the frequency of the electromagnetic noise generated from the circuit substrate 212.

First, the shift of the resonance frequency of the housing 214 by the protrusion amount p of the ridge part 216f in the side wall 216b of the first housing component 216 and the depth d of the groove 218e in the side wall 218b of the second housing component 218 is as described with reference to FIG. 10 in the first embodiment described above.

Next, the shift of the resonance frequency of the housing 214 by the width w of the cutout portion 216g in the ridge part 216f of the side wall 216b of the first housing component 216 will be described.

Figure 16:
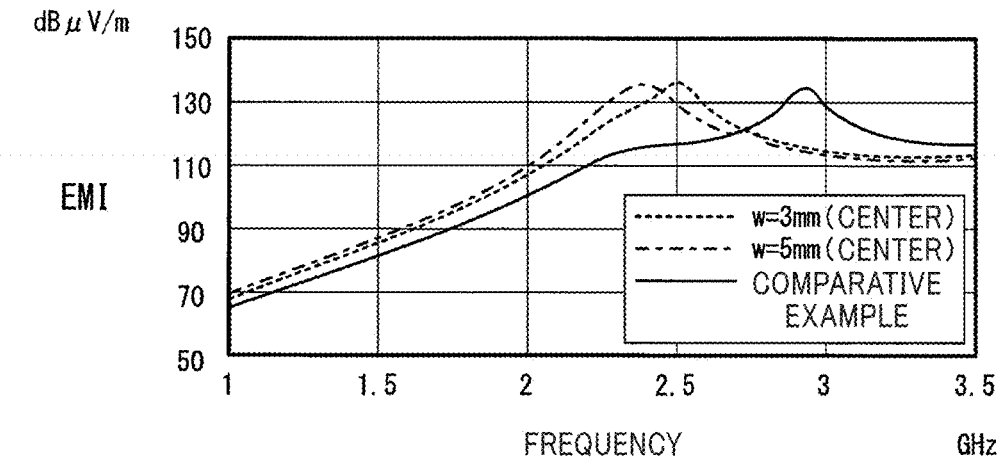
FIG. 16 is a frequency-EMI characteristic diagram illustrating another shift of the resonance frequency of the housing.

FIG. 16 is a frequency-EMI characteristic diagram illustrating another shift of the resonance frequency of the housing.

The frequency-EMI characteristic diagram of FIG. 16 is a result obtained by simulation, in which a frequency of electromagnetic noise radiated from the circuit substrate is changed, and intensity of the electromagnetic noise (EMI) which changes accordingly and is radiated from the housing is illustrated. In FIG. 16, a solid line indicates the intensity of the electromagnetic noise radiated from the housing 114 of the electronic apparatus 110 of the comparative example. The broken line indicates the intensity of the electromagnetic noise radiated from the housing 114 of the electronic apparatus 110 of the comparative example in which the cutout portion is formed, and indicates the intensity when the width w (the size in the extending direction of the inner wall portion 116f) of the cutout portion formed at the center of the first inner wall portion 116f of the first housing component 116 is 3 mm. Further, the alternate long and short dash line indicates the intensity of the electromagnetic noise radiated from the housing 14 of the electronic apparatus 110 of the comparative example in which the cutout portion is formed, and indicates the intensity when the width w of the cutout portion is 5 mm.

As indicated by a broken line and an alternate long and short dash line in FIG. 16, in the housing 114 of the electronic apparatus 110 according to the comparative example in which the cutout portion is formed, when width w of the cutout portion formed in the first inner wall portion 118f of the first housing component 116 increases, a peak value of intensity of EMI radiated from the housing 114 shifts to the low frequency side, that is, a resonance frequency of the housing 114 shifts to the low frequency side. In addition, the peak value shifts to the lower frequency side as compared with the peak value of the intensity of EMI radiated from the housing 114 of the electronic apparatus 110 of the comparative example in which the cutout portion is not formed.

Such a shift of the peak value of the intensity of EMI is considered to occur by a change in the length of the "element" of the "dipole antenna" due to the cutout portion. In the present second embodiment, as illustrated in FIG. 13, the entire length of a portion (a portion indicated by cross-hatching) facing the second housing component 218 via the insulator increases by the lengths of a rising portion 216h and a falling portion 216i of the cutout portion 216g. Therefore, the length of a portion functioning as the "element" of the "dipole antenna" increases. As a result, the peak value of the intensity of EMI radiated from the housing 114 shifts to the low frequency side, that is, the resonance frequency of the housing 114 shifts to the low frequency side. The inventors have found a change in frequency characteristics of the housing 114 due to such a cutout portion by simulation.

In addition, providing the cutout portion as in the present second embodiment has an advantage that not only the peak value of the intensity of EMI radiated from the housing 214 shifts to the low frequency side, but also the intensity itself of EMI radiated from the housing 214 may decrease. This is because the radiation efficiency of the electromagnetic wave can be expected to decrease in the corner of the cutout portion.

Note that FIG. 16 illustrates a shift of the resonance frequency in a case where a cutout portion is formed in the electronic apparatus 110 of the comparative example illustrated in FIGS. 6 to 9. It is presumed that the similar shift of the resonance frequency occurs also when the cutout portion 216g is provided in the ridge part 216f in the side wall 216b of the first housing component 216 as in the present second embodiment.

Therefore, if the cutout portion 216g having an appropriate width w is provided at the center of the side wall 216b of the first housing component 216 in the extending direction of the ridge part 216f, the resonance frequency of the housing 214 can be made different from the frequency of the electromagnetic noise generated from the circuit substrate 212.

Subsequently, the shift of the resonance frequency of the housing 214 by the height h of the dielectric 226 disposed between the first fixing part 216d of the first housing component 216 and the second fixing part 218c of the second housing component 218 will be described.

Figure 17:
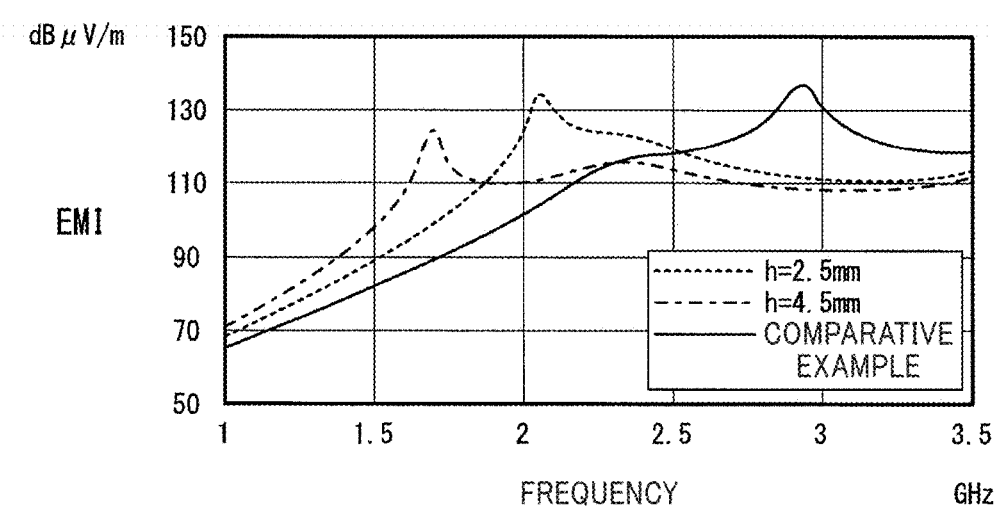
FIG. 17 is a frequency-EMI characteristic diagram illustrating still another shift of the resonance frequency of the housing.

FIG. 17 is a frequency-EMI characteristic diagram illustrating another shift of the resonance frequency of the housing.

The frequency-EMI characteristic diagram of FIG. 17 is a result obtained by simulation, in which a frequency of electromagnetic noise radiated from the circuit substrate is changed, and intensity of the electromagnetic noise (EMI) which changes accordingly and is radiated from the housing is illustrated. In FIG. 17, a solid line indicates the intensity of the electromagnetic noise radiated from the housing 114 of the electronic apparatus 110 of the comparative example. Further, a broken line indicates the intensity of the electromagnetic noise radiated from the housing 114 of the electronic apparatus 110 of the comparative example in which the dielectric is provided, and indicates the intensity when the height h of the dielectric (that is, the distance between the first fixing part 116*d* and the second fixing part 118*c*) is 2.5 mm. Further, the alternate long and short dash line indicates the intensity of the electromagnetic noise radiated from the housing 114 of the electronic apparatus 110 of the comparative example in which the dielectric is provided, and indicates the intensity when the height h of the dielectric is 4.5 mm.

As indicated by the broken line and the alternate long and short dash line in FIG. 17, in the housing 114 of the electronic apparatus 110 according to the comparative example in which the dielectric is provided, when the height h of the dielectric increases, the peak value of the intensity of EMI radiated from the housing 114 shifts to the low frequency side, that is, the resonance frequency of the housing 114 shifts to the low frequency side. Along with this, the peak value also decreases. In addition, as compared with the peak value of the intensity of EMI radiated from the housing 114 of the electronic apparatus 110 of the comparative example in which the dielectric is not provided, the peak value shifts to the low frequency side and decreases.

Such a shift in the peak value of the intensity of EMI is considered to occur when a portion of the shaft portion of the fixing screw that penetrates the dielectric functions as an "inductance". That is, the first fixing part 116*d* of the first housing component 116 and the second fixing part 118*c* of the second housing component 118 are electrically connected via "inductance". When the first housing component 116 and the second housing component 118 are electrically connected via the "inductance", the length of the "element" of the "dipole antenna" formed by the connection is increased. As a result, the peak value of the intensity of EMI radiated from the housing 114 shifts to the low frequency side, that is, the resonance frequency of the housing shifts to the low frequency side. The inventors have found by simulation the frequency characteristics with respect to such inductance between the first and second housing components 116 and 118.

When the dielectric is provided as in the present second embodiment, there are advantages that not only the peak value of the intensity of EMI radiated from the housing 114 is shifted to the low frequency side, but also the intensity itself of EMI radiated from the housing 114 is reduced. This is because the radiation efficiency of the electromagnetic wave decreases at a portion where the dielectric is in contact with the first fixing part 116*d* or the second fixing part 118*c*.

Note that FIG. 17 illustrates a shift of the resonance frequency in a case where the dielectric is provided in the electronic apparatus 110 of the comparative example illustrated in FIGS. 6 to 9. When the dielectric 226 is provided between the first fixing part 216*d* of the first housing component 216 and the second fixing part 218*c* of the second housing component 218 as in the present second embodiment, it is presumed that a similar shift in resonance frequency occurs.

Therefore, when the first fixing part 216*d* of the first housing component 216 and the second fixing part 218*c* of the second housing component 218 are brought into contact with each other via the dielectric 26 having the appropriate height h, the resonance frequency of the housing 214 can be made different from the frequency of the electromagnetic noise generated from the circuit substrate 212.

Also in the present second embodiment, as in the above-described embodiment, in an electronic apparatus including a circuit substrate that generates electromagnetic noise and a housing that accommodates the circuit substrate, a resonance frequency of the housing can be made different from a frequency of the electromagnetic noise generated from the circuit substrate.

Although the present disclosure has been described above with reference to the first and second embodiments, the embodiments of the present disclosure are not limited thereto.

For example, in the case of the above-described first embodiment, the noise generation source that is accommodated in the housing 14 and generates electromagnetic noise that can cause the housing 14 to resonate is the circuit substrate 12. However, in the embodiment of the present disclosure, the noise generation source is not limited to the circuit substrate. The noise generation source may be, for example, a sensor.

In addition, in the case of the above-described second embodiment, the dielectric 226 disposed between the first fixing part 216*d* of the first housing component 216 and the second fixing part 218*c* of the second housing component 218 is a member made of a resin material. However, the embodiments of the present disclosure are not limited to this. The dielectric may be, for example, air. In this case, the first fixing part 216*d* and the second fixing part 218*c* face each other with a space therebetween. When the metal particles are dispersed inside the dielectric, the radiation efficiency of the electromagnetic wave decreases, so that there is an advantage that the intensity of EMI radiated from the housing 114 further decreases.

Furthermore, in the case of the above-described second embodiment, in the ridge part 216*f* of the side wall 216*b* of the first housing component 216, the cutout portion 216*g* is disposed at the center in the extending direction of the ridge part 216*f*. However, the position on the ridge part where the cutout portion is disposed is not limited to the center.

Figure 18:
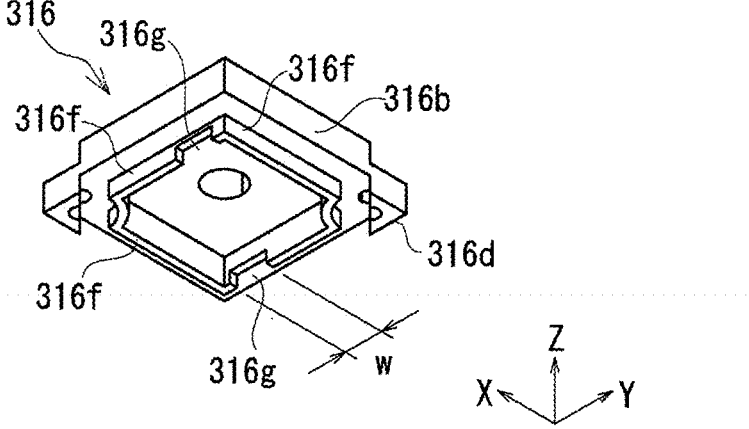
FIG. 18 is a lower perspective view of a first housing component in an electronic apparatus according to another embodiment of the present disclosure.
Figure 19:
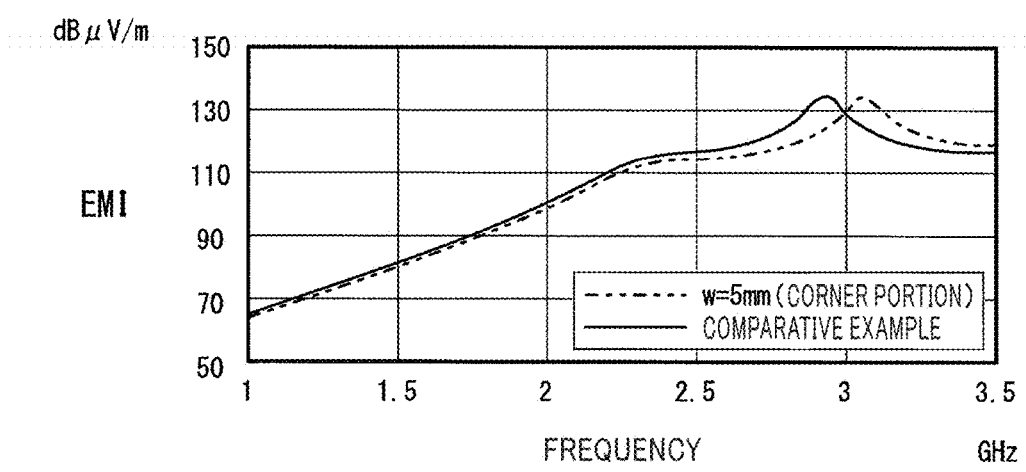
FIG. 19 is a frequency-EMI characteristic diagram illustrating a further different shift of the resonance frequency of the housing.

FIG. 18 is a lower perspective view of a first first housing component in an electronic apparatus according to another embodiment of the present disclosure. FIG. 19 is a frequency-EMI characteristic diagram illustrating a further different shift of the resonance frequency of the housing.

FIG. 18 illustrates a first housing component 316 in an electronic apparatus according to another embodiment. The electronic apparatus according to another embodiment corresponds to the electronic apparatus 110 of the comparative example illustrated in FIGS. 6 to 9 in which a cutout portion 316*g* is formed. The cutout portion 316*g* is formed in the first inner wall portion 316*f* of the side wall 316*b* of the first housing component 316 not at the center in the extending direction but at a position shifted from the center. Specifically, the cutout portion 316*g* is formed near a corner portion formed by connecting the two first inner wall portions 316*f*.

When the cutout portion 316*g* is formed in the first inner wall portion 316*f* near the corner portion as described above, as illustrated in FIG. 19, the peak value (two-dot chain line) of the intensity of EMI radiated from the housing shifts to the high frequency side as compared with the peak value (solid line) of the electronic apparatus 110 of the comparative example in which the cutout portion is not formed.

Such a shift of the peak value of the intensity of EMI is considered to occur by a change in the length of the "element" of the "dipole antenna" due to the cutout portion. As described above, when the cutout portion is formed away from the corner portion, the total length of the portions facing each other with the insulator interposed therebetween increases by the lengths of the rising portion and the falling portion of the cutout portion. On the other hand, when the cutout portion is formed near the corner portion, the cutout portion exists at a position away from the first and second fixing parts which are feeding portions of the "dipole antenna". When the cutout portion exists at a position away from the feeding portions, the function of the position as the "element" is deteriorated. The influence of this deterioration is greater than the influence of an increase in the total length of the portions facing each other with the insulator interposed therebetween by the lengths of the rising portion and the falling portion of the cutout portion. Therefore, when the cutout portion is formed near the corner portion, the length of the "element" is shortened. As a result, when the cutout portion is formed near the corner portion, the peak value of the intensity of EMI radiated from the housing shifts to the high frequency side.

Therefore, in the second embodiment described above, even if the position of the cutout portion 216g is disposed near the corner portion of the housing, the resonance frequency of the housing can be made different from the frequency of the electromagnetic noise generated from the circuit substrate.

That is, in a broad sense, an electronic apparatus according to an embodiment of the present disclosure includes: a noise generation source that generates electromagnetic noise; and a housing that is made of a conductive material and accommodates the noise generation source, in which the housing includes first and second housing components that define an accommodation space that accommodates the noise generation source, the first housing component includes: a first fixing part that is fixed to the second housing component; and at least two ridge parts that protrude toward the second housing component and extend in directions away from the first fixing part, and the second housing component includes: a second fixing part that is fixed to the first fixing part of the first housing component; and at least two grooves extending in directions away from the second fixing part and into which the two ridge parts enter, and the ridge parts and the grooves each have a protrusion amount and a depth that make a resonance frequency of the housing different from a frequency of the electromagnetic noise.

Note that, in the case of the above-described second embodiment, the resonance frequency of the housing 214 is different from the frequency of the electromagnetic noise generated from the circuit substrate 212 in the electronic apparatus 210 including the circuit substrate 212 that generates the electromagnetic noise by the respective effects of (1) the ridge part 216f and the groove 218e, (2) the cutout portion 216g, and (3) the dielectric 226, and the housing 214 that accommodates the circuit substrate 212.

In an electronic apparatus including a noise generation source that generates electromagnetic noise and a housing that accommodates the noise generation source, the cutout portion or the dielectric alone can make a resonance frequency of the housing different from a frequency of the electromagnetic noise generated from the noise generation source.

Figure 20:
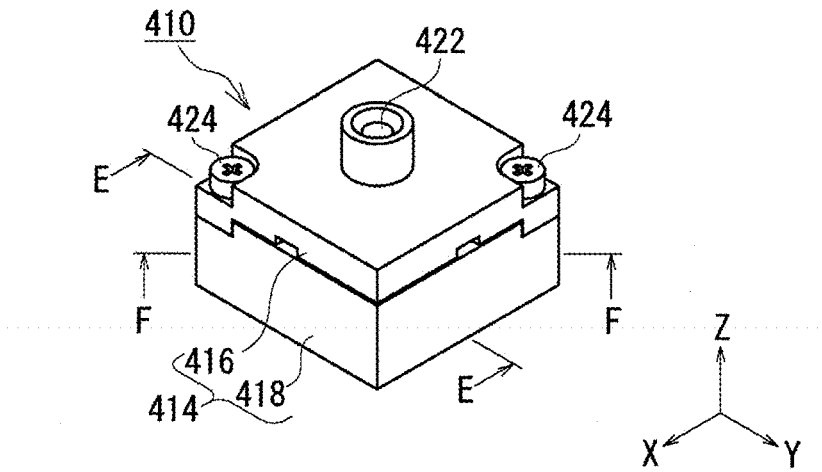
FIG. 20 is an upper perspective view of an electronic apparatus as an example.
Figure 21:
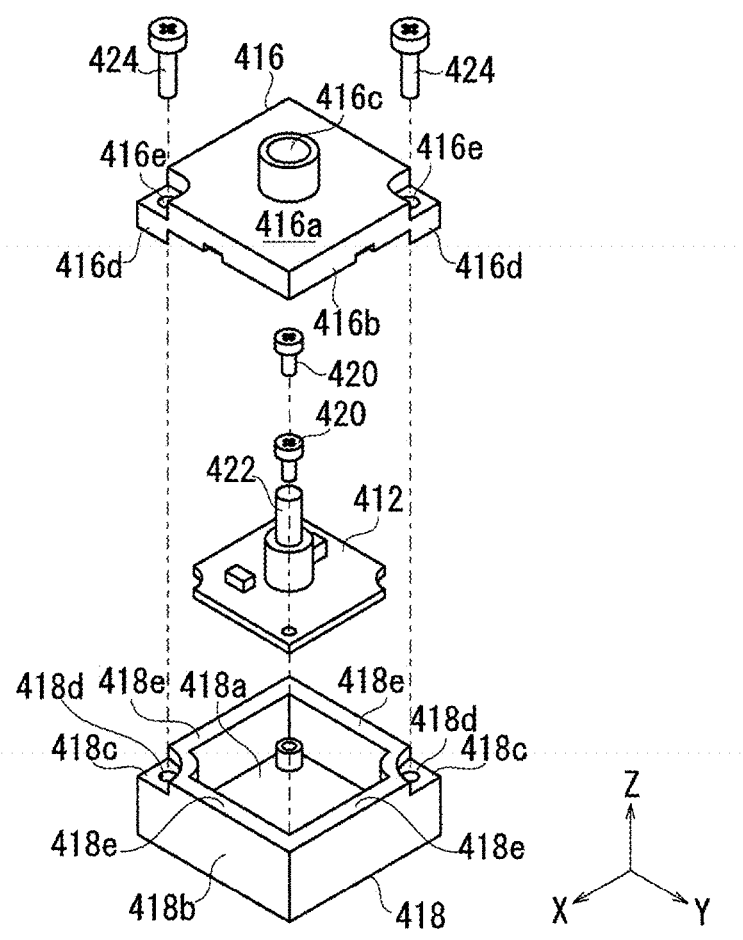
FIG. 21 is an exploded perspective view of an electronic apparatus as an example.

FIG. 20 is an upper perspective view of an electronic apparatus as an example. FIG. 21 is an exploded perspective view of the electronic apparatus as an example.

As illustrated in FIGS. 20 and 21, in an electronic apparatus 410 of the present example, the electronic apparatus 410 includes a circuit substrate 412 that is a generation source that generates electromagnetic noise, and a housing 414 that is made of a conductive material such as a metal material and accommodates the circuit substrate 412. The housing 414 is rectangular parallelepiped in shape and includes a first housing component 416 and a second housing component 418.

Figure 22:
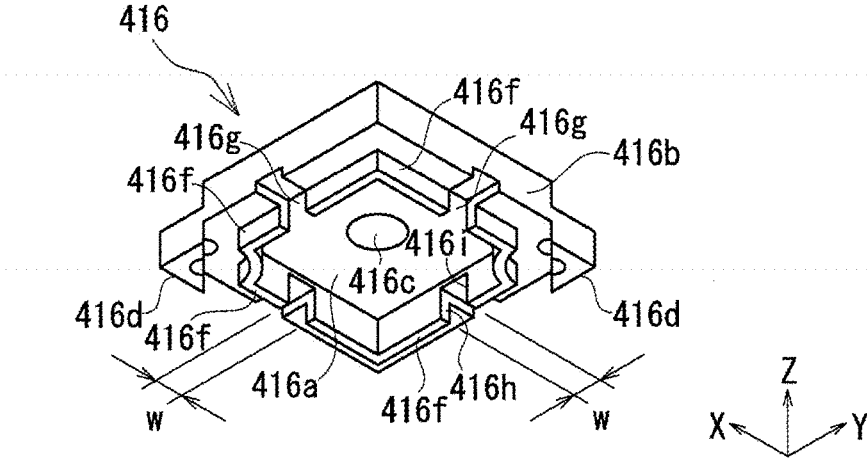
FIG. 22 is a lower perspective view of a first housing component in an electronic apparatus as an example.
Figure 23:
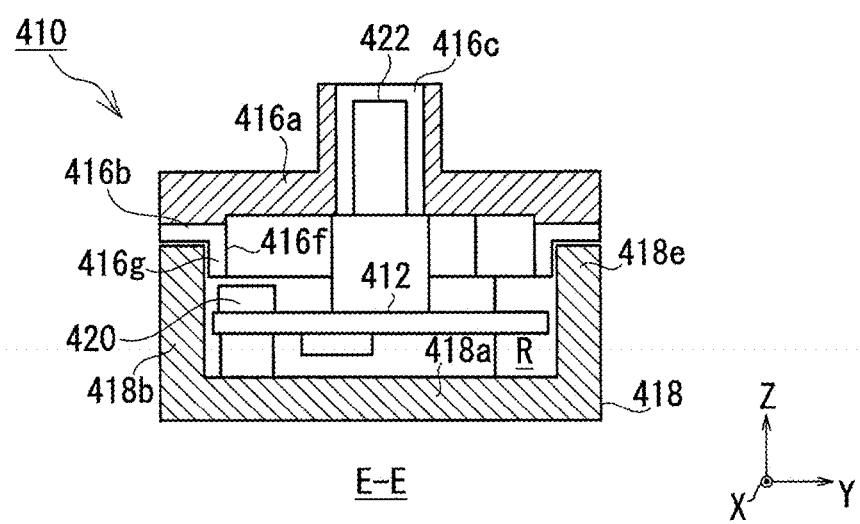
FIG. 23 is a cross-sectional view of the electronic apparatus taken along line E-E in FIG. 20.
Figure 24:
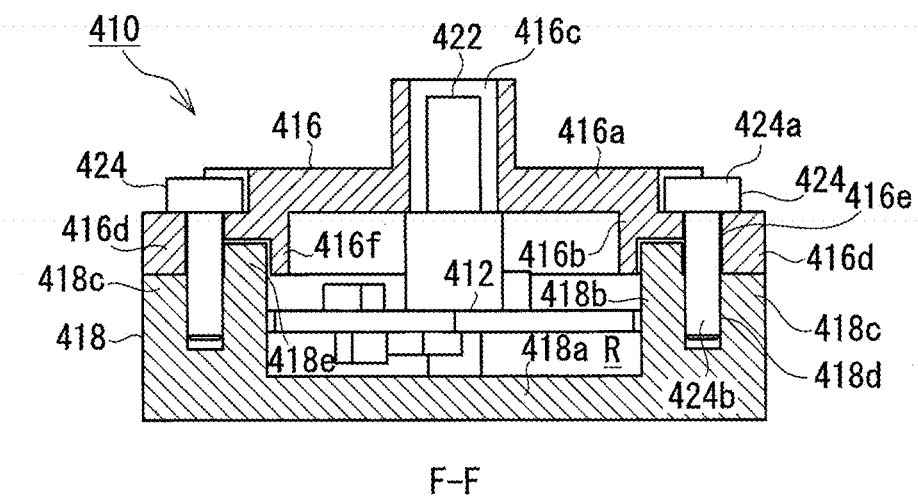
FIG. 24 is a cross-sectional view of the electronic apparatus taken along line F-F in FIG. 20.

FIG. 22 is a lower perspective view of the first housing component in the electronic apparatus as an example. FIG. 23 is a cross-sectional view of the electronic apparatus taken along line E-E in FIG. 20. FIG. 24 is a cross-sectional view of the electronic apparatus taken along line F-F in FIG. 20.

As illustrated in FIGS. 23 and 24, the first housing component 416 and the second housing component 418 are engaged with each other to define an accommodation space R that accommodates the circuit substrate 412. Specifically, in the present example, the first housing component 416 has a substantially bottomed cylindrical shape and includes a rectangular plate-like base portion 416a and a side wall 416b protruding from an outer peripheral edge of the base portion 416a toward the second housing component 418. The second housing component 418 has a substantially bottomed cylindrical shape and includes a rectangular plate-like base portion 418a and a side wall 418b protruding from an outer peripheral edge of the base portion 418b toward the first housing component 416. The side wall 416b of the first housing component 416 and the side wall 418b of the second housing component 418 face each other at their respective top surfaces. When the first housing component 416 and the second housing component 418 are engaged with each other, the accommodation space R surrounded by the base portion 416a and the side wall 416b of the first housing component 416, and the base portion 418a and the side wall 418b of the second housing component 418 is defined.

In the case of the present example, the circuit substrate 412 is fixed to the base portion 418a of the second housing component 418 via a plurality of fixing screws 420. As a result, the circuit substrate 412 is electrically connected to the ground of the second housing component 418 (The potential of the second housing component 418 is the same as the ground potential of the circuit substrate 412.). In addition, when the electronic apparatus 410 is a small camera, an optical element such as a lens is attached to the second housing component 418. A connection cable 422 (cable including power cable and signal cable) that connects the circuit substrate 12 and an external device (not illustrated) passes through a through hole 416c formed in the base portion 416a of the first housing component 416.

The first and second housing components 416 and 418 are made of a conductive material, such as a metal material. In the case of the present example, the first and second housing components 416 and 418 are made of aluminum die-casting (ADC12). As a result, radiation of electromagnetic noise generated from the circuit substrate 412 to the outside of the electronic apparatus 410 (electromagnetic interference (EMI)) is suppressed, and malfunction resistance (electromagnetic susceptibility (EMS)) of the circuit substrate 412 due to electromagnetic noise from the outside is improved.

In addition, in the case of the present example, the first and second housing components 416 and 418 are fixed to each other via a plurality of fixing screws 424.

Specifically, the side wall 416b of the first housing component 416 includes a first fixing part 416d fixed to the second housing component 418. In addition, the side wall 418b of the second housing component 418 includes a second fixing part 418c fixed to the first fixing part 416d of the first housing component 416.

In the case of the present example, two first fixing parts 416d are arranged diagonally on the rectangular side wall 416b of the first housing component 416 as viewed in the engagement direction (as viewed in the Z-axis direction) of the first and second housing components 416 and 418.

Similarly, two second fixing parts 418c are arranged diagonally on the rectangular side wall 418b of the second housing component 418.

In the case of the present example, a through hole 416e through which the fixing screw 424 passes is formed in the first fixing part 416d of the first housing component 416. A female screw hole 418d into which the fixing screw 424 is screwed is formed in the second fixing part 418c of the second housing component 418. The fixing screw 424 passes through the through hole 416e of the first fixing part 416d and is screwed into the female screw hole 418d of the second fixing part 418c, whereby the first fixing part 416d and the second fixing part 418c are fixed and are connected in a direct current manner. Alternatively, a female screw hole may be formed in the first fixing part 416d, and a through hole may be formed in the second fixing part 418c.

In the case of the present example, the first housing component 416 and the second housing component 418 are made of aluminum die-cast and subjected to alumite treatment. Therefore, the contact surfaces of the first fixing part 416d and the second fixing part 418c are covered with the oxide film, and thus are not connected in a direct current manner. However, the first fixing part 416d and the second fixing part 418c are connected in a direct current manner via the fixing screw 424 made of a conductive material such as a metal material. That is, a head portion 424a of the fixing screw 424 is in contact with the first fixing part 416d and is connected in a direct current manner, and a shaft portion 424b of the fixing screw 424 on which a male screw is formed is screwed into the female screw hole 418d of the second fixing part 418c and is connected in a direct current manner. The oxide film of a portion of the first fixing part 416d in contact with the head portion 424a of the fixing screw 424 is scraped off by the rotation of the head portion 424a when the fixing screw 424 is tightened, so that the portion can be connected to the head portion 424a of the fixing screw 424 in a direct current manner. Further, since the female screw hole 418d is formed by tapping after alumite treatment, the female screw hole can be connected to the shaft portion 424b of the fixing screw 424 in a direct current manner.

In the case of the present example, the side wall 416b of the first housing component 416 includes a first inner wall portion 416f that protrudes toward the second housing component 418 and extends in a direction away from each of the plurality of first fixing parts 416d (X-axis direction or Y-axis direction). Specifically, two first inner wall portions 416f extend in a direction away from one first fixing part 416d. In the case of the present example, the plurality of (four) first inner wall portions 416f are connected to each other to constitute one annular inner wall portion.

In the case of the present example, the side wall 418b of the second housing component 418 includes a plurality of second inner wall portions 418e protruding toward the first housing component 416 and extending in a direction away from the plurality of second fixing parts 418c (X-axis direction or Y-axis direction). Specifically, two second inner wall portions 418e extend in a direction away from one first fixing part 418c. In the case of the present example, the plurality of (four) second inner wall portions 418e are connected to each other to constitute one annular inner wall portion. Further, the inner wall portions 418e are arranged on the outer side with respect to the first inner wall portions 416f of the first housing component 416 with a gap. When the surfaces of the first and second housing components 416 and 418 are covered with an oxide film (insulating layer), the second inner wall portion 418e may be in contact with the first inner wall portion 416f.

Furthermore, in the case of the present example, a cutout portion 416g is formed in the top surface of at least one of the plurality of first inner wall portions 416f of the side wall 416b of the first housing component 416. In the case of the present example, the cutout portion 416g is formed in each of the plurality of first inner wall portions 416f.

The cutout portion 416g has a groove shape extending from the inside to the outside of the housing 414, and divides the top surface of the first inner wall portion 416f. In the case of the present example, the cutout portion 416b is formed at the center in the extending direction (X-axis direction or Y-axis direction) of the first inner wall portion 416f.

Due to the presence of such a cutout portion 416g, the effect illustrated in FIG. 16 can be obtained, that is, the resonance frequency of the housing 414 can be made different from the frequency of the electromagnetic noise, similarly to the above-described second embodiment.

Figure 25:
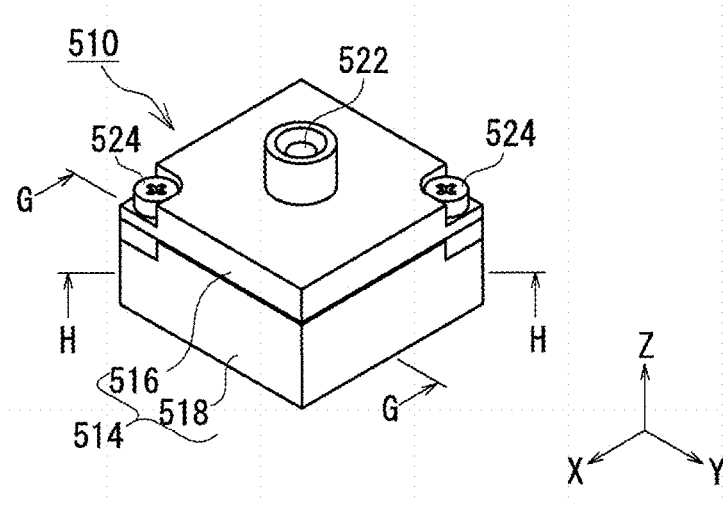
FIG. 25 is an upper perspective view of an electronic apparatus of another example.
Figure 26:
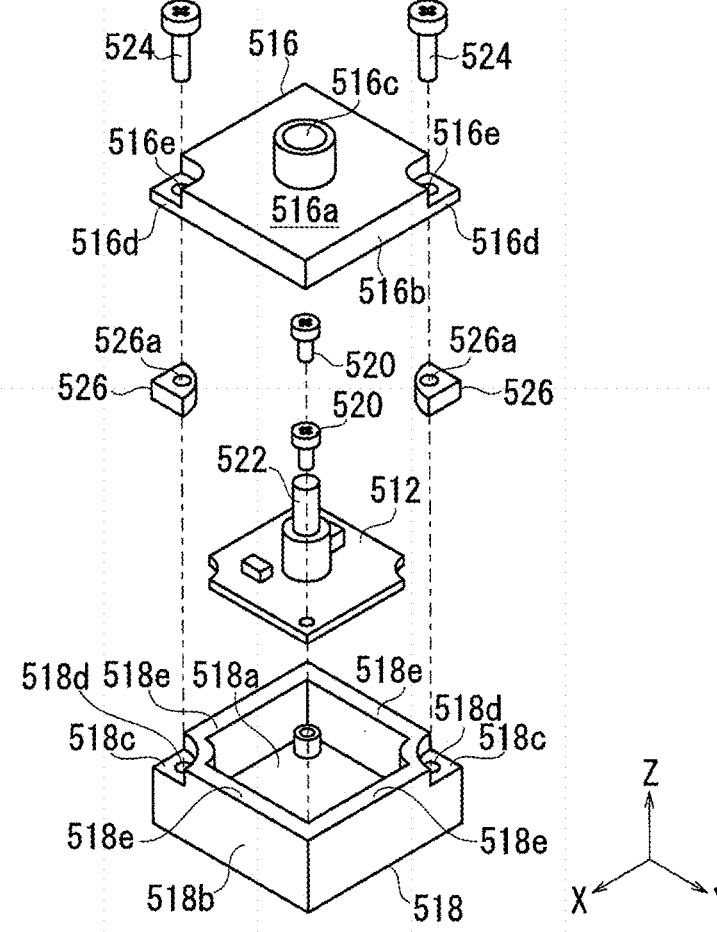
FIG. 26 is an exploded perspective view of an electronic apparatus of another example.

FIG. 25 is an upper perspective view of an electronic apparatus of another example. FIG. 26 is an exploded perspective view of the electronic apparatus of another example.

As illustrated in FIGS. 25 and 26, an electronic apparatus 510 of the present example includes a circuit substrate 512 that is a generation source that generates electromagnetic noise, and a housing 514 that is made of a conductive material such as a metal material and accommodates the circuit substrate 512. The housing 514 is rectangular parallelepiped in shape and includes a first housing component 516 and a second housing component 518.

Figure 27:
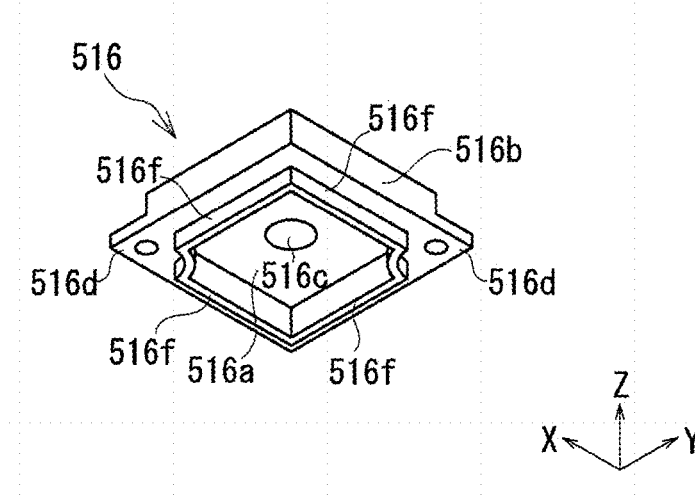
FIG. 27 is a lower perspective view of a first housing component in an electronic apparatus of another example.
Figure 28:
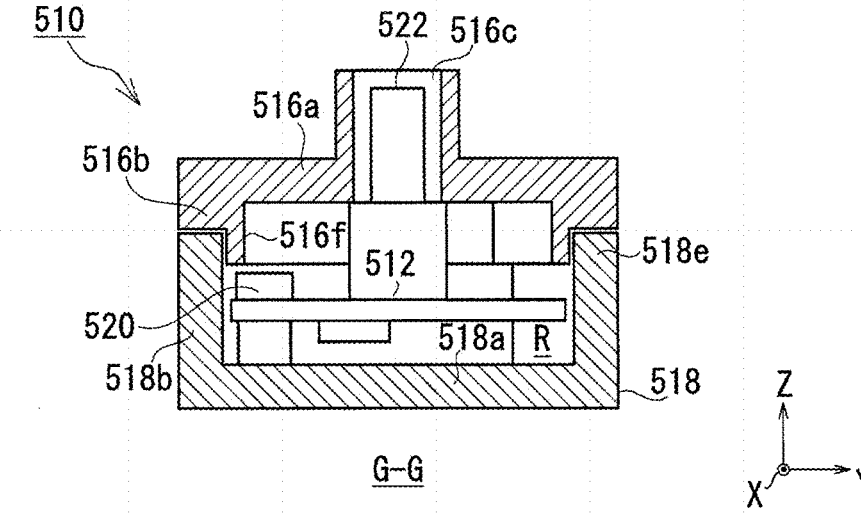
FIG. 28 is a cross-sectional view of the electronic apparatus taken along line G-G in FIG. 25.
Figure 29:
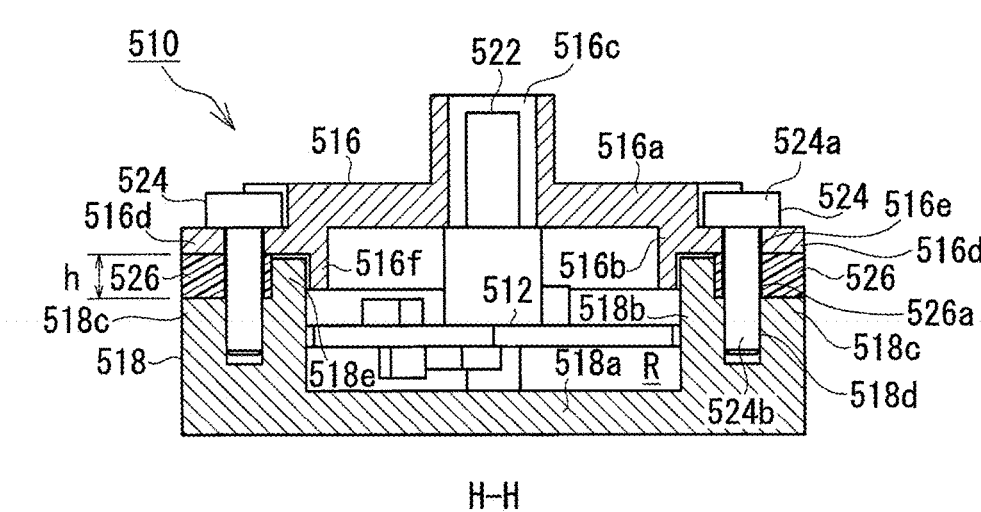
FIG. 29 is a cross-sectional view of the electronic apparatus taken along line H-H in FIG. 25.

FIG. 27 is a lower perspective view of a first housing component in an electronic apparatus of another example. FIG. 28 is a cross-sectional view of the electronic apparatus taken along line G-G in FIG. 25. FIG. 29 is a cross-sectional view of the electronic apparatus taken along line H-H in FIG. 25.

As illustrated in FIGS. 28 and 29, the first housing component 516 and the second housing component 518 are engaged with each other to define an accommodation space R that accommodates the circuit substrate 512. Specifically, in the case of the present example, the first housing component 516 has a substantially bottomed cylindrical shape and includes a rectangular plate-like base portion 516a and a side wall 516b protruding from an outer peripheral edge of the base portion 516a toward the second housing component 518. The second housing component 518 has a substantially bottomed cylindrical shape and includes a rectangular plate-like base portion 518a and a side wall 518b protruding from an outer peripheral edge of the base portion 518b toward the first housing component 516. The side wall 516b of the first housing component 516 and the side wall 518b of the second housing component 518 face each other at their respective top surfaces. When the first housing component 516 and the second housing component 518 are engaged with each other, the accommodation space R surrounded by the base portion 516a and the side wall 516b of the first housing component 516, and the base portion 518a and the side wall 518b of the second housing component 518 is defined.

In the case of the present example, the circuit substrate 512 is fixed to the base portion 518a of the second housing component 518 via a plurality of fixing screws 520. As a result, the circuit substrate 512 is electrically connected to the ground of the second housing component 518 (The potential of the second housing component 58 is the same as the ground potential of the circuit substrate 512.). In addition, when the electronic apparatus 510 is a small camera, an optical element such as a lens is attached to the second housing component 518. A connection cable 522 (cable including power cable and signal cable) that connects the circuit substrate 512 and an external device (not illustrated) passes through a through hole 516c formed in the base portion 516a of the first housing component 516.

The first and second housing components 516 and 518 are made of a conductive material, such as a metal material. In the case of the present example, the first and second housing components 516 and 518 are made of aluminum die-cast (ADC12). As a result, radiation of electromagnetic noise generated from the circuit substrate 512 to the outside of the electronic apparatus 510 (electromagnetic interference (EMI)) is suppressed, and malfunction resistance (electromagnetic susceptibility (EMS)) of the circuit substrate 512 due to electromagnetic noise from the outside is improved.

In addition, in the case of the present example, the first and second housing components 516 and 518 are fixed to each other via a plurality of fixing screws 524.

Specifically, the side wall 516b of the first housing component 516 includes a first fixing part 516d fixed to the second housing component 518. In addition, the side wall 518b of the second housing component 518 includes a second fixing part 518c fixed to the first fixing part 516d of the first housing component 516.

In the case of the present example, two first fixing parts 516d are arranged diagonally on the rectangular side wall 516b of the first housing component 516 as viewed in the engagement direction (as viewed in the Z-axis direction) of the first and second housing components 516 and 518. Similarly, two second fixing parts 518c are arranged diagonally on the rectangular side wall 518b of the second housing component 518.

In the case of the present example, a through hole 516e through which the fixing screw 524 passes is formed in the first fixing part 516d of the first housing component 516. A female screw hole 518d into which the fixing screw 524 is screwed is formed in the second fixing part 518c of the second housing component 518. The fixing screw 524 passes through the through hole 516e of the first fixing part 516d and is screwed into the female screw hole 518d of the second fixing part 518c, whereby the first fixing part 516d and the second fixing part 518c are fixed to each other and are connected in a direct current manner. Alternatively, a female screw hole may be formed in the first fixing part 516d, and a through hole may be formed in the second fixing part 518c.

In the case of the present example, the first housing component 516 and the second housing component 518 are made of aluminum die-cast and subjected to alumite treatment. Therefore, the contact surfaces of the first fixing part 516d and the second fixing part 518c are covered with the oxide film, and thus are not connected in a direct current manner. However, the first fixing part 516d and the second fixing part 518c are connected in a direct current manner via the fixing screw 524 made of a conductive material such as a metal material. That is, a head portion 524a of the fixing screw 524 is in contact with the first fixing part 516d and is connected in a direct current manner, and a shaft portion 524b of the fixing screw 524 on which a male screw is formed is screwed into the female screw hole 518d of the second fixing part 518c and is connected in a direct current manner. The oxide film of a portion of the first fixing part 516d in contact with the head portion 524a of the fixing screw 524 is scraped off by the rotation of the head portion 524a when the fixing screw 524 is tightened, so that the portion can be connected to the head portion 524a of the fixing screw 524 in a direct current manner. Further, since the female screw hole 518d is formed by tapping after alumite treatment, the female screw hole can be connected to the shaft portion 524b of the fixing screw 524 in a direct current manner.

In the case of the present example, the side wall 516b of the first housing component 516 includes a first inner wall portion 516f that protrudes toward the second housing component 518 and extends in a direction away from each of the plurality of first fixing parts 516d (X-axis direction or Y-axis direction). Specifically, two first inner wall portions 516f extend in a direction away from one first fixing part 516d. In the case of the present example, the plurality of (four) first inner wall portions 516f are connected to each other to constitute one annular inner wall portion.

In the case of the present example, the side wall 518b of the second housing component 518 includes a plurality of second inner wall portions 518e protruding toward the first housing component 516 and extending in a direction away from the plurality of second fixing parts 518c (X-axis direction or Y-axis direction). Specifically, two second inner wall portions 518e extend in a direction away from one first fixing part 518c. In the case of the present example, the plurality of (four) second inner wall portions 518e are connected to each other to constitute one annular inner wall portion. In addition, the second inner wall portions 518e are arranged on the outer side with respect to the first inner wall portion 516f of the first housing component 516 with a gap. When the surfaces of the first and second housing components 516 and 518 are covered with an oxide film (insulating layer), the second inner wall portion 18e may be in contact with the first inner wall portion 516f.

Furthermore, in the case of the present example, the first fixing part 516d of the first housing component 516 and the second fixing part 518c of the second housing component 518 are not directly contacted but are contacted via the dielectric 526. The dielectric 526 is a member made of, for example, a resin material, and includes a through hole 526a through which a shaft portion 524b of the fixing screw 524 passes.

Due to the presence of the dielectric 526, as in the above-described second embodiment, it is possible to obtain the effect as illustrated in FIG. 17, that is, the resonance frequency of the housing 514 can be made different from the frequency of the electromagnetic noise.

As described above, the embodiments have been described as examples of the technology in the present disclosure. For this purpose, the accompanying drawings and detailed description are provided. Therefore, the components described in the accompanying drawings and the detailed description may include not only components essential for solving the problem but also components that are not essential for solving the problem in order to illustrate the technique. Therefore, it should not be immediately recognized that these non-essential components are essential as those non-essential components are described in the accompanying drawings and detailed description.

Moreover, since the above-mentioned embodiments are for demonstrating the technology in the present disclosure, various changes, substitutions, additions, omissions, etc. can be performed in a claim or its equivalent range.

INDUSTRIAL APPLICABILITY

The present disclosure is applicable to an electronic apparatus including a noise generation source that generates electromagnetic noise and a housing that accommodates the noise generation source.

What is claimed is:

1. An electronic apparatus comprising:

a noise generation source that generates electromagnetic noise; and a housing made of a conductive material and accommodating the noise generation source, wherein the housing includes first and second housing components defining an accommodation space for accommodating the noise generation source, the first housing component includes a first fixing part fixed to the second housing component, and at least two ridge parts protruding toward the second housing component and extending in directions away from the first fixing part, the second housing component includes a second fixing part fixed to the first fixing part of the first housing component, and at least two grooves extending in directions away from the second fixing part and into which the two ridge parts enter, the ridge parts and the grooves each have a protrusion amount and a depth that make a resonance frequency of the housing different from a frequency of the electromagnetic noise, and wherein extending-direction lengths of each of the ridge parts and each of the grooves is approximately ¼ of a wavelength of a frequency of the electromagnetic noise.

2. The electronic apparatus according to claim 1, wherein a cutout portion is formed on a top surface of each of the ridge parts.

3. The electronic apparatus according to claim 1, wherein the noise generation source is a circuit substrate.

4. The electronic apparatus according to claim 1, wherein the electronic apparatus is a camera.

5. An electronic apparatus comprising:

a noise generation source that generates electromagnetic noise; and a housing made of a conductive material and accommodating the noise generation source, wherein the housing includes first and second housing components defining an accommodation space for accommodating the noise generation source, the first housing component includes first fixing parts fixed to the second housing component, and at least two ridge parts protruding toward the second housing component and extending in directions away from the first fixing parts, the second housing component includes second fixing parts, each of which is fixed to a corresponding one of the first fixing parts of the first housing component, and at least two grooves extending in directions away from the second fixing parts and into which the two ridge parts enter, the ridge parts and the grooves each have a protrusion amount and a depth that make a resonance frequency of the housing different from a frequency of the electromagnetic noise, wherein two of the first fixing parts are arranged diagonally on the first housing component, and two of the second fixing parts are arranged diagonally on the second housing component.

6. The electronic apparatus according to claim 5, wherein a cutout portion is formed on a top surface of each of the ridge parts.

7. The electronic apparatus according to claim 5, wherein the noise generation source is a circuit substrate.

8. The electronic apparatus according to claim 5, wherein the electronic apparatus is a camera.

9. An electronic apparatus comprising:

a noise generation source that generates electromagnetic noise; and a housing made of a conductive material and accommodating the noise generation source, wherein the housing includes first and second housing components defining an accommodation space for accommodating the noise generation source, the first housing component includes a first fixing part fixed to the second housing component, and at least two ridge parts protruding toward the second housing component and extending in directions away from the first fixing part, the second housing component includes a second fixing part fixed to the first fixing part of the first housing component, and at least two grooves extending in directions away from the second fixing part and into which the two ridge parts enter, wherein a through hole is formed in one of the first fixing part of the first housing component and the second fixing part of the second housing component, and a female screw hole is formed in the other of the first fixing part and the second fixing part, and the housing further includes a fixing screw that is made of a conductive material, passes through the through hole, and is screwed into the female screw hole.

10. The electronic apparatus according to claim 9, wherein the housing further includes a dielectric disposed between the first and second housing components, the first fixing part and the second fixing part are in contact with each other via the dielectric, and the fixing screw penetrates the dielectric.

11. The electronic apparatus according to claim 9, wherein a cutout portion is formed on a top surface of each of the ridge parts.

12. The electronic apparatus according to claim 9, wherein the noise generation source is a circuit substrate.

13. The electronic apparatus according to claim 9, wherein the electronic apparatus is a camera.

* * * * *